US006952058B2

(12) United States Patent
McCoin

(10) Patent No.: US 6,952,058 B2
(45) Date of Patent: Oct. 4, 2005

(54) WIND ENERGY CONVERSION SYSTEM

(75) Inventor: Dan Keith McCoin, El Paso, TX (US)

(73) Assignee: WECS, Inc., Albuquerque, NM (US)

( * ) Notice: Subject to any disclaimer, the term of this patent is extended or adjusted under 35 U.S.C. 154(b) by 0 days.

(21) Appl. No.: 10/883,214

(22) Filed: Jul. 1, 2004

(65) Prior Publication Data

US 2005/0082839 A1 Apr. 21, 2005

Related U.S. Application Data

(63) Continuation-in-part of application No. 10/783,413, filed on Feb. 20, 2004.
(60) Provisional application No. 60/448,355, filed on Feb. 20, 2003.

(51) Int. Cl.[7] .............................. H02P 9/04; F03D 9/00
(52) U.S. Cl. ............................. 290/44; 290/54; 290/52; 290/53; 415/2; 415/4; 415/208; 416/119
(58) Field of Search .............................. 290/44, 55, 54, 290/52; 415/2, 4, 208; 416/119

(56) References Cited

U.S. PATENT DOCUMENTS

| 25,269 | A | | 8/1859 | Livingston |
|---|---|---|---|---|
| 1,233,232 | A | | 7/1917 | Heyroth |
| 1,352,960 | A | | 9/1920 | Heyroth |
| 1,944,239 | A | | 1/1934 | Honnef |
| 2,563,279 | A | | 8/1951 | Rushing |
| 3,883,750 | A | | 5/1975 | Uzzell, Jr. |
| 4,039,848 | A | * | 8/1977 | Winderl .................. 290/55 |
| 4,116,581 | A | * | 9/1978 | Bolie ..................... 415/4.4 |
| 4,182,594 | A | | 1/1980 | Harper et al. |
| 4,274,809 | A | | 6/1981 | Delgado et al. |
| 4,365,929 | A | | 12/1982 | Retz |
| 4,398,096 | A | | 8/1983 | Faurholtz |
| 4,525,124 | A | | 6/1985 | Watson et al. |

(Continued)

FOREIGN PATENT DOCUMENTS

EP        0 679 805 A1    11/1995

OTHER PUBLICATIONS

News from PR Newswire—Internet news article, "First National Power Corporatioin (Formerly Capstone International Corp.) Enters Discussions to Acquire WindCrank (TM) and Vertical Wind Turbine Technologies LLC of Hawaii, Feb. 20, 2004, 7 pages."

"Concentrating Windsystems—Sense or Nonsense?", Internet article, University of Stuttgart, 5 pgs.

"Diffuser Development for a Diffuser Augmented Wind Turbine Using Computational fluid Dynamics", D.G. Phillips, P.J. Richards, R.G.J. Flay, Dept. of Mech. Engineering, Univ. of Auckland, NZ, 15 pgs.

"Aerodynamic analysis and monitoring of the Vortec 7 diffuser–augmented wind turbine", D.G. Phillips, R.G.J. Flay, T.A. Nash, Apr. 14, 1999, 7 pgs.

*Primary Examiner*—Darren Schuberg
*Assistant Examiner*—Iraj A. Mohandesi

(57) ABSTRACT

A wind energy conversion system includes upper and lower wind turbines having counter-rotating blade assemblies supported for rotation about a vertical rotation axis, with each blade assembly carrying a rotor for rotation past a stator to produce an electrical output. The wind turbines are supported by a tower at an elevated position above the ground. Each wind turbine produces torque, and the wind energy conversion system provides for balancing the torques to avoid a net torque on the tower. Adjustment mechanisms are provided for adjusting blade pitch and for adjusting the size of an air gap between a stator and a rotor that comes into alignment with the stator as the rotor rotates therepast. The wind energy conversion system provides a hood for supplying intake air to a wind turbine and an exhaust plenum for exhausting air from the wind turbine, with the hood and the exhaust plenum being directionally positionable.

13 Claims, 15 Drawing Sheets

U.S. PATENT DOCUMENTS

| | | |
|---|---|---|
| 4,720,640 A | 1/1988 | Anderson et al. |
| 4,764,090 A | 8/1988 | Danson |
| D300,932 S | 5/1989 | Sikes |
| 4,979,871 A | 12/1990 | Reiner |
| 5,226,806 A | 7/1993 | Lubbers |
| 5,299,913 A | 4/1994 | Heidelberg |
| 5,315,159 A | 5/1994 | Gribnau |
| 5,457,346 A | 10/1995 | Blumberg et al. |
| 5,503,530 A | 4/1996 | Walters |
| 5,506,453 A * | 4/1996 | McCombs ............... 290/44 |
| 5,518,367 A | 5/1996 | Verastegui |
| 5,664,418 A | 9/1997 | Walters |
| 6,064,123 A | 5/2000 | Gislason |
| 6,242,818 B1 | 6/2001 | Smedley |
| 6,278,197 B1 | 8/2001 | Appa |
| 6,492,743 B1 | 12/2002 | Appa |
| 6,504,260 B1 | 1/2003 | Debleser |
| 6,655,907 B2 | 12/2003 | Brock et al. |
| 6,688,842 B2 | 2/2004 | Boatner |
| 2003/0137149 A1 | 7/2003 | Northrup et al. |
| 2004/0047732 A1 | 3/2004 | Sikes |

* cited by examiner

WIND ENERGY CONVERSION SYSTEM

CROSS-REFERENCE TO RELATED PATENT APPLICATION

This application is a continuation-in-part of prior U.S. patent application Ser. No. 10/783,413 filed Feb. 20, 2004, which claims priority from prior provisional patent application Ser. No. 60/448,355 filed Feb. 20, 2003, the entire disclosures of which are incorporated herein by reference.

BACKGROUND OF THE INVENTION

1. Field of the Invention

The present invention relates generally to wind energy conversion systems in which kinetic energy of wind is converted into electric power and, more particularly, to wind energy conversion systems having blade assemblies carrying rotor elements for movement past stator elements to produce electric current.

2. Brief Discussion of the Related Art

Current wind power technology has primarily been developed by adapting or modifying non-wind technologies to wind power applications. This approach has resulted in wind power systems of excessive weight and cost, which has limited the cost-effectiveness and acceptance of wind power systems as a viable option for electric power production. As an example, a 500 KWe Vesta V39 wind power system typically weighs over 33 tons and costs more than $1,000,000 installed. The capital cost of such a system is around $2000 per KWe (about four times the capital cost of a coal plant), and the system weight translates to about 132 pounds per KWe. Consequently, the use of wind as a renewable energy source has not been taken full advantage of, and the wind power industry has not realized its full potential.

Current wind power technology typically utilizes "wind turbines", which are in fact propellers normally of large diameter, i.e. 135 feet or more, and including two, three, four or five blades rotatable about a horizontal or nearly horizontal axis to effect rotation of a drive shaft. The propellers ordinarily rotate at extremely slow speeds due to their substantial mass and the centrifugal force at the blade roots. The drive shafts must be very large and very heavy, as represented by the following calculation of the size and weight needed for a solid steel drive shaft to transmit torque in a 500 KWe wind turbine system at 1 rpm.

$$KWe = \frac{0.746 \times torque \times rpm}{5,252};$$

$$torque = \frac{5,252 \times KWe}{0.746 \times rpm}.$$

Where rpm equals 1 and KWe equals 500, $$torque = \frac{5,252 \times 500}{0.746 \times 1} = \frac{2,626,000}{0.746} = 3,520,107 \text{ ft.-lbs.}$$

Assuming a yield strength of 10,000 psi for the solid steel drive shaft, $$d = ((16 \times torque) \div (\pi \times 10,000 \text{ psi}))^{\frac{1}{3}} = 12.148 \text{ inches.}$$

Assuming a safety margin of 4 for fatigue, the diameter of the drive shaft needed is 19.284 inches, and this massive drive shaft must be rotated by the blades at low rpm. In addition, a drive shaft of this diameter is equivalent to 995 pounds per linear foot of the drive shaft.

Rotation of the drive shaft at low rotational speeds in prior wind turbine systems must be increased or stepped up in speed to about 900 to 3,600 rpm to drive a conventional generator. Increasing the drive shaft speed to drive a generator requires a large, costly and heavy gear step-up transmission assembly. The generator, weighing several tons, also contributes significant weight to the wind turbine system. An aerodynamic housing, such as the Nacelle, is commonly used in prior wind turbine systems to house equipment and typically weighs about 36,000 pounds. The excessive weight of conventional wind turbine systems necessitates a massive and costly tubular steel tower to support the propellers in an elevated position above the ground.

Conventional wind turbine systems commonly utilize positioning systems including computers and hydraulics to position the propellers to face into the oncoming wind and to "feather" the propellers, i.e. turn the propellers orthogonal to the wind in high wind conditions. One drawback to these positioning systems is that they shut down under the highest potential power output conditions.

Representative wind power systems are disclosed in U.S. Pat. No. 25,269 to Livingston, U.S. Pat. Nos. 1,233,232 and 1,352,960 to Heyroth, U.S. Pat. No. 1,944,239 to Honnef, U.S. Pat. No. 2,563,279 to Rushing, U.S. Pat. No. 3,883,750 to Uzzell, Jr., U.S. Pat. No. 4,182,594 to Harper et al, U.S. Pat. No. 4,398,096 to Faurholtz, U.S. Pat. No. 4,720,640 to Anderson et al, U.S. Pat. No. 5,299,913 to Heidelberg, U.S. Pat. No. 5,315,159 to Gribnau, U.S. Pat. No. 5,457,346 to Blumberg et al, U.S. Pat. No. 6,064,123 to Gislason, U.S. Pat. Nos. 6,278,197 B1 and 6,492,743 B1 to Appa, U.S. Pat. No. 6,504,260 B1 to Debleser, and U.S. Pat. No. 6,655,907 B2 to Brock et al, in U.S. Patent Application Publication No. US 2003/0137149 A1 to Northrup et al, and in German Patent DE 32 44 719 A1.

Only the Livingston patent discloses a blade assembly rotatable about a vertical axis of rotation. The blade assembly of the Livingston patent rotates a drive shaft and does not carry a rotor element for rotation past a stator element to produce electric current directly. Blade assemblies that carry rotor elements for rotation past stator elements to produce electric current are disclosed in the patents to Heyroth ('232 and '960), Honnef, Harper et al, Anderson et al, Gribnau, Gislason, and Brock et al, in the U.S. Patent Application Publication to Northrup et al and in the German patent, but the blade assemblies rotate about horizontal axes of rotation. The blade assembly of the Honnef patent comprises two counter-rotating wheels each having a rim carrying dynamo elements. The dynamo elements of one wheel rotate in opposition to the dynamo elements of the other wheel to produce electricity. The Honnef patent does not disclose two blade assemblies each capable of producing an electrical output independently. A wind power system having two counter-rotating blade assemblies in which each blade assembly carries rotor elements for rotation past stator elements is disclosed by Harper et al. Wind power systems having hoods for supplying air to the blade assemblies and having air intake openings facing lateral to the rotation axes of the blade assemblies are represented by the Livingston patent and the Brock et al patent.

In light of the foregoing, there is a need for a wind energy conversion system having two blade assemblies supported for rotation in opposite directions about a vertical rotation axis, with each blade assembly carrying a rotor for rotation past a stator to produce an electrical output directly and independently. There is also a need for a wind energy conversion system having two wind turbines with blade assemblies supported for rotation in opposite directions wherein the torques produced by the wind turbines are capable of being balanced to avoid a net torque on the tower. A further need exists for a wind energy conversion system having a blade assembly supported for rotation about a rotation axis, a hood disposed over the blade assembly having an air intake opening facing lateral to the rotation axis, and an exhaust plenum disposed beneath the blade assembly having an outlet opening, with the hood being rotatable about the rotation axis to maintain the air intake opening facing upwind and the exhaust plenum being rotatable about the rotation axis to maintain the outlet opening facing downwind. Another need exists for a wind energy conversion system having a blade assembly carrying a rotor for rotation past a stator to produce electric current, wherein the size of the air gap between the rotor and the stator is adjustable to control output current voltage in response to changes in rotational speed of the blade assembly.

SUMMARY OF THE INVENTION

Accordingly, it is an object of the present invention to overcome the aforementioned disadvantages of prior wind power systems.

Another object of the present invention is to provide a wind energy conversion system utilizing upper and lower wind turbines having blade assemblies rotated in opposite directions about a vertical rotation axis.

A further object of the present invention is to utilize a guyed tower to support counter-rotating blade assemblies in an elevated position above the ground.

An additional object of the present invention is to adjust blade pitch for counter-rotating blade assemblies of a wind energy conversion system to control the rotational speed of the blade assemblies.

It is also an object of the present invention to adjust blade pitch for counter-rotating blade assemblies of a wind energy conversion system to establish nominal conversion of wind velocity into torque.

The present invention has as another object to provide a wind energy conversion system of reduced weight, mass and cost.

Moreover, it is an object of the present invention to adjust the size of the air gap between a stator and a rotor carried by a blade assembly for rotation past the stator to control output voltage in a wind energy conversion system.

Additionally, it is an object of the present invention to adjust the size of the air gap between a stator and a rotor carried by a blade assembly for rotation past the stator to control the rotational speed of the blade assembly in a wind energy conversion system.

The present invention has as an additional object to adjust the directional position for an outlet opening of an exhaust plenum to maintain the outlet opening facing downwind in response to changes in the directional position for an air intake opening of a hood facing upwind in a wind energy conversion system.

Yet a further object of the present invention is to configure the stator element of a wind turbine to present an air gap of varying size in relation to a rotor to produce a varying voltage output.

Still another object of the present invention is to rotate a rotor past the stator elements of three single phase generators and to time the output of the generators to obtain a three phase power output in a wind energy conversion system.

It is an additional object of the present invention to supply a water mist to the intake air in a wind energy conversion system.

Moreover, it is an object of the present invention to selectively articulate a stator to selectively increase and/or decrease the size of an air gap between the stator and a rotor carried by a blade assembly for rotation past the stator in a wind energy conversion system.

Still a further object of the present invention is to automatically adjust the size of an air gap between a stator and a rotor carried by a blade assembly for rotation past the stator in response to changes in rotational speed of the blade assembly such that output voltage changes are restricted.

The present invention has as another object to balance the torques produced by counter-rotating wind turbines of a wind energy conversion system to avoid net torque being exerted on a tower supporting the wind turbines in an elevated position above the ground.

It is also an object of the present invention to relieve air pressure from an air intake hood to regulate maximum power and/or shear forces in a wind energy conversion system.

The aforesaid objects are achieved individually and in combination, and it is not intended that the present invention be construed as requiring two or more of the objects to be combined.

Some of the advantages of the present invention are that the wind energy conversion system may include one or more than one wind turbine, each having a blade assembly; the blade assemblies do not drive a drive shaft as in prior wind turbine systems; the weight of the wind energy conversion system is greatly reduced permitting lighter and less expensive guyed towers, stabilized by guy cables, to be used to support the one or more wind turbines in an elevated position above the ground; optimum performance versus cost and weight may be accomplished by varying the size of a center void and spinner for the blade assemblies; the air intake opening is maintained facing into the oncoming wind without the need for power consuming equipment and/or computers to direct yaw; intake air is deflected by the spinner toward the effective blade area of the one or more wind turbines; blade structure is eliminated from the short radius, low torque position where virtually no power is produced, thusly resulting in greater efficiency and decreased weight; exhaust air is discharged from the one or more wind turbines with greater efficiency, less back pressure on the one or more wind turbines and enhanced laminar air flow; the wind energy conversion system allows the commutators and brushes associated with conventional generators and which require maintenance and downtime to be eliminated; wind turbines of larger generating capacities can be supported at higher elevations to the advantage of greater wind speeds; greater power output is obtained using less air space than prior wind turbine systems; the wind energy conversion system can be used to generate DC or AC power; a greater number of wind energy conversion systems can be deployed per acre of land than conventional wind turbine systems; each stator may comprise a continuous stator element or a plurality of individual stator elements; each rotor may comprise a variable number of rotor elements; the blades of the blade assemblies have an airfoil configuration and are optimally sized in relation to spaces between the blades; a rudder assembly operates in conjunction with the intake hood to produce positive yaw on the hood; the exhaust plenum is configured to create a vacuum at the outlet opening; the outer rims of the blade assemblies are supported and positioned between cooperating rollers; electric power produced by the one or more wind turbines may be stored in batteries, which may be charged under control of a charging controller; the torque created by each wind turbine can be monitored in various ways; mild compression in the hood increases the velocity of the air through the turbines, thereby enhancing output at lower input wind speeds; the exhaust plenum may be designed to assist directional yaw; operation of the water misters may be controlled so that only water misters located adjacent the air intake opening are turned on; and output from the water misters may be controlled in accordance with the electrical output of the one or more wind turbines.

These and other objects, advantages and benefits are realized with the present invention as generally characterized in a wind energy conversion system comprising an upper wind turbine, a lower wind turbine disposed below the upper wind turbine, a tower supporting the wind turbines in an elevated position above the ground, and a balancing mechanism for balancing the torques produced by each wind turbine to avoid a net torque on the tower. The upper wind turbine includes a stator, a blade assembly mounted for rotation about a vertical rotation axis in response to air flow through the upper wind turbine, and a rotor carried by the blade assembly for rotation past the stator to produce an electrical output. The lower wind turbine comprises a stator, a blade assembly mounted for rotation about the vertical rotation axis in response to air flow through the lower wind turbine, and a rotor carried by the blade assembly of the lower wind turbine for rotation past the stator of the lower wind turbine to produce an electrical output. The blade assembly of the upper wind turbine rotates in a first direction about the vertical rotation axis while the blade assembly for the lower wind turbine rotates in a second direction, opposite the first direction, about the vertical rotation axis.

Each rotor preferably comprises a plurality of permanent magnets that come into alignment with the corresponding stator as the magnets rotate in a rotational path. The stator for each wind turbine preferably comprises a plurality of stator coils spaced from one another along the rotational path for the corresponding magnets. The stator for each wind turbine may comprise three single phase generators each having a stator coil along the rotational path, with the output of the generators being timed to obtain a three phase electrical output. Each stator coil may comprise a pair of curved stator coil segments, with the stator coil segments curving away from the plane of the rotational path to produce an electrical output of changing voltage.

Each blade assembly may comprise an inner rim, an outer rim concentric with the inner rim and a plurality of blades extending between the outer and inner rims radial to the vertical rotation axis. The balancing mechanism may comprise a pitch adjustment mechanism for each wind turbine for adjusting the pitch angle of the blades. The balancing mechanism may include an air gap adjustment mechanism for each wind turbine for adjusting the size of an air gap between the stator of the wind turbine and the rotor of the wind turbine that comes into alignment with the stator as the rotor rotates therepast. The wind energy conversion system may comprise a hood disposed over the upper wind turbine for supplying intake air to the wind turbines and an exhaust plenum disposed below the lower wind turbine for exhausting air away from the wind turbines. One or more strain gages or other monitors may be provided for monitoring turbine torque.

The present invention is further generally characterized in a wind energy conversion system comprising a wind turbine having a stator, a blade assembly mounted for rotation about a vertical rotation axis in response to air passing through the wind turbine, a rotor carried by the blade assembly for rotation past the stator to produce an electrical output, a tower supporting the wind turbine in an elevated position above the ground, and an air gap adjustment mechanism for adjusting the size of an air gap between the stator and the rotor which comes into alignment with the stator as it rotates therepast. The rotor is carried by the blade assembly in a rotational path disposed in a plane, and the rotor comes into alignment with the stator as it rotates in the rotational path. The air gap is defined between the stator and the rotor when the rotor is in alignment therewith.

The air gap adjustment mechanism includes a track along which the stator is movable toward and away from the plane of the rotational path to respectively decrease or increase the size of the air gap. The air gap adjustment mechanism may include a housing mounting the stator with the housing being movable along the track. The track can mount the housing for movement of the stator along a direction perpendicular to the plane of the rotational path. The stator may be mounted by the housing at a predetermined location along the rotational path, and the stator may remain at this location while being moved in the direction perpendicular to the plane of the rotational path. The track can mount the housing for movement of the stator along a direction at an acute angle to the plane of the rotational path, with the stator moving along the rotational path as it is moved along the track toward or away from the plane of the rotational path. The stator may be moved automatically along the direction at an acute angle to the plane of the rotational path to increase the size of the air gap in response to increased drag force on the stator due to increased rotational speed of the blade assembly. The stator may be moved automatically along the direction at an acute angle to the plane of the rotational path to decrease the size of the air gap in response to decreased drag force on the stator due to decreased rotational speed of the blade assembly. The air gap adjustment mechanism may comprise a resilient restraining member applying a force on the stator in opposition to increased drag force on the stator. The air gap adjustment mechanism may further comprise a strain gage for monitoring torque produced by the wind turbine.

The present invention is also generally characterized in a wind energy conversion system comprising a wind turbine having a stator, a blade assembly mounted for rotation about a vertical rotation axis in response to air passing through the wind turbine, a rotor carried by the blade assembly for rotation past the stator to produce electrical power, a tower supporting the wind turbine in an elevated position above the ground, a hood disposed over the wind turbine and an exhaust plenum disposed beneath the wind turbine, with the hood and the exhaust plenum each being directionally positionable. The hood defines an air intake passage for supplying intake air to the wind turbine and has an intake opening facing lateral to the vertical rotation axis for taking in air and a discharge opening for discharging the air toward the wind turbine. The hood is rotatable about the vertical axis to maintain the intake opening facing upwind. The exhaust plenum defines an exhaust passage for exhausting air from the wind turbine and has an outlet opening facing away from the vertical rotation axis for exhausting the air from the exhaust plenum. The exhaust plenum is rotatable about the vertical rotation axis to maintain the output opening facing downwind. The exhaust plenum may be rotated via a drive mechanism in response to rotation of the hood. The hood may include relief ports for relieving excess intake air from the hood. The wind energy conversion system may include a water misting system for releasing water into the intake air. The wind energy conversion system may comprise upper and lower wind turbines with the hood disposed over the upper wind turbine and the exhaust plenum disposed beneath the lower wind turbine.

Other objects and advantages of the present invention will become apparent from the following description of the preferred embodiments taken in conjunction with the accompanying drawings, wherein like parts in each of the several figures are identified by the same reference characters. Various components or parts of the wind energy conversion system have been partly or entirely eliminated from or partly or entirely broken away in some of the drawings for the sake of clarity.

DESCRIPTION OF THE PREFERRED EMBODIMENTS

Figure 1A:
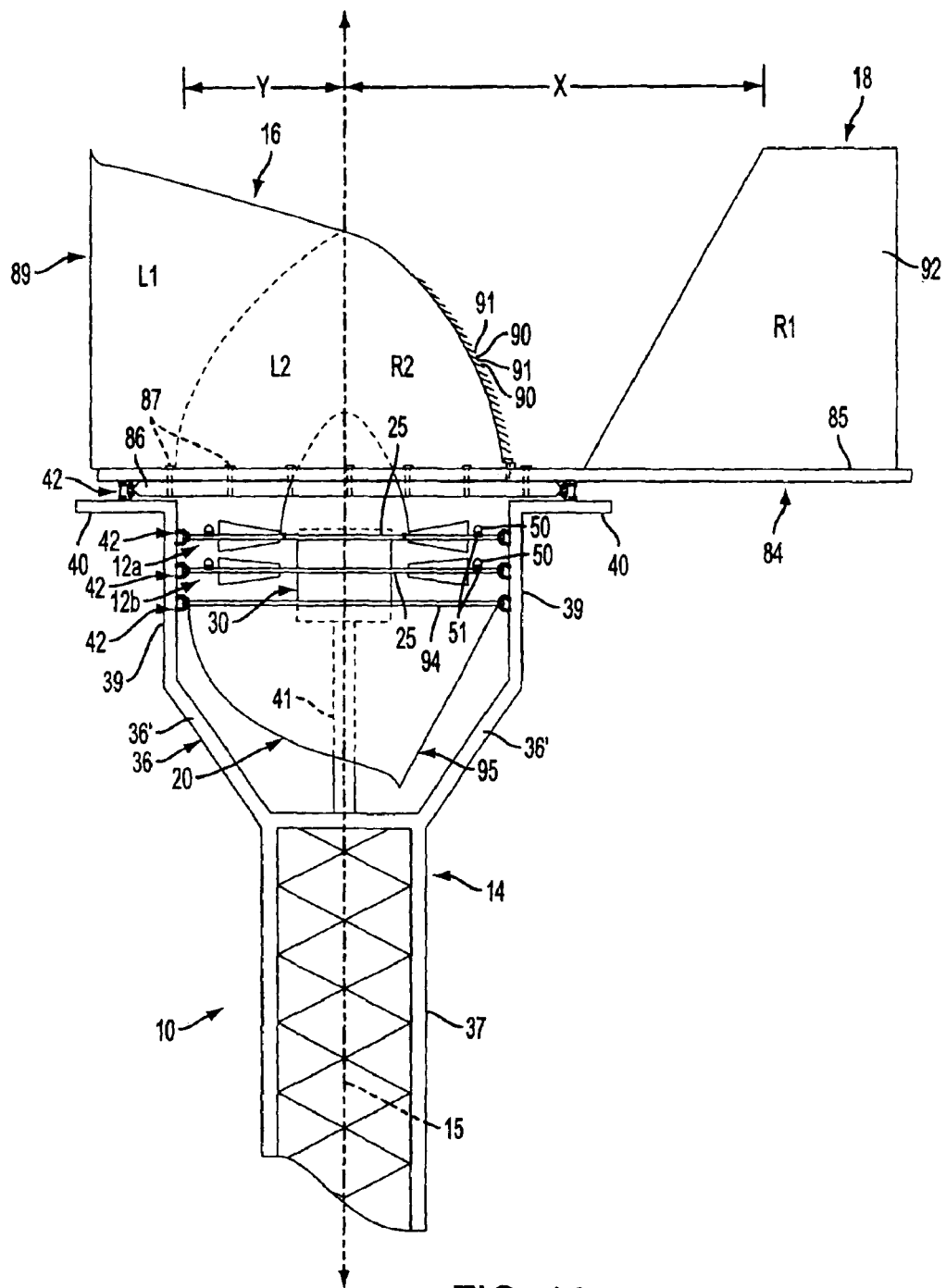
FIG. 1A is a broken side view of a wind energy conversion system according to the present invention.
Figure 1B:
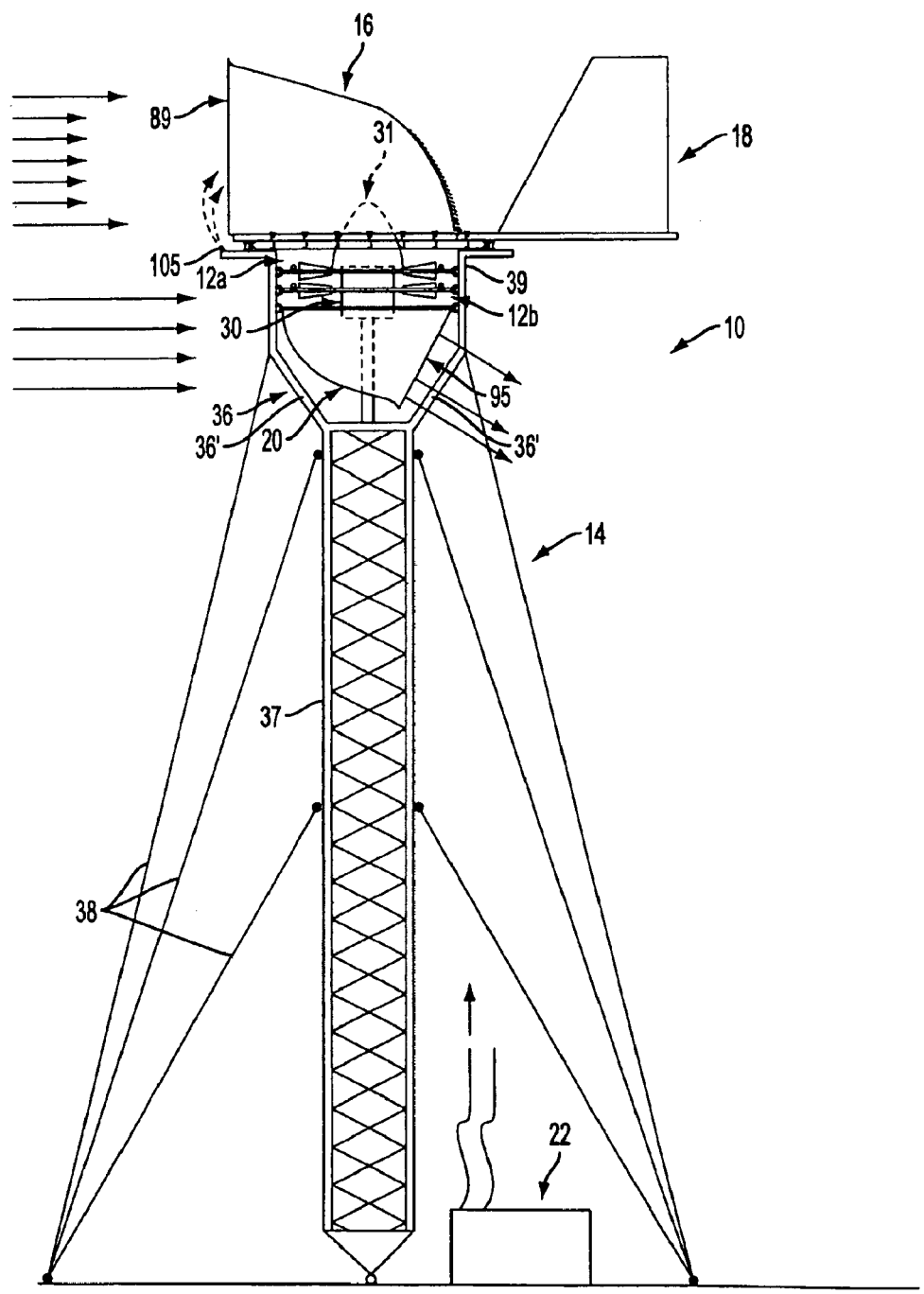
FIG. 1B is a side view of the wind energy conversion system.

A wind energy conversion system or wind power system 10 according to the present invention is illustrated in FIGS. 1A and 1B and comprises upper and lower wind turbines 12a and 12b forming an electrical generator, a tower 14 supporting the wind turbines 12a and 12b at an elevated position above the ground for rotation about a vertical rotation axis 15, an air intake hood or snorkel 16 disposed over the upper wind turbine 12a for directing intake air to the wind turbines, a rudder assembly 18 for positioning the hood 16, and an exhaust plenum 20 disposed beneath the lower wind turbine 12b for exhausting air from the wind turbines. Although the wind energy conversion system 10 is shown as comprising upper and lower wind turbines 12a and 12b, it should be appreciated that the wind energy conversion system may comprise a single wind turbine, such as wind turbine 12a or 12b, forming the electrical generator as disclosed in prior provisional patent application Ser. No. 60/448,355 filed Feb. 20, 2003 and incorporated herein by reference. Each wind turbine 12a and 12b produces an electrical power output directly and independently via rotors carried by blade assemblies of the wind turbines rotating past stators of the wind turbines, respectively. Power output from the wind turbines is supplied to an electrical device 22 which may comprise an electrical load and/or an electrical storage device such as a battery bank comprising one or more batteries.

Figure 2:
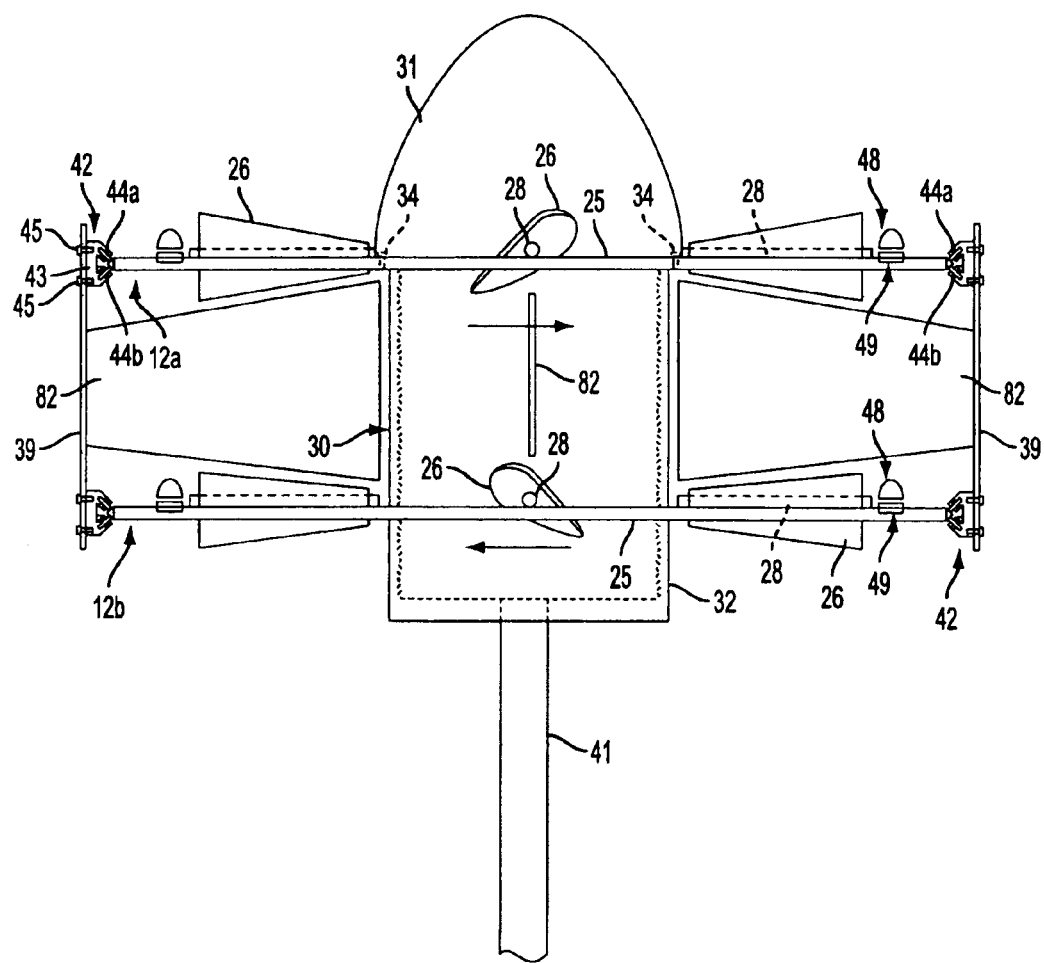
FIG. 2 is a broken side view depicting upper and lower wind turbines of the wind energy conversion system.
Figure 3:
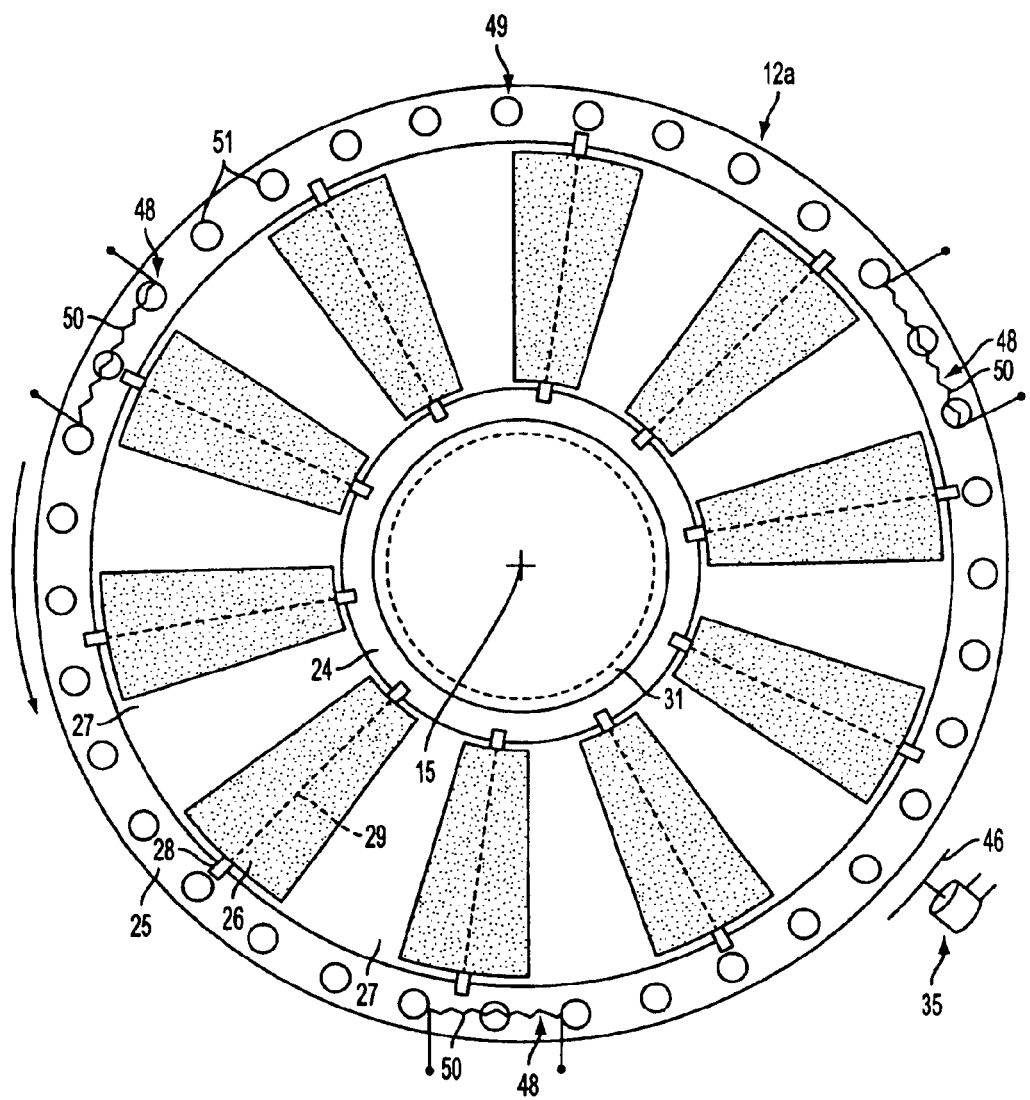
FIG. 3 is a top view of the upper wind turbine.

Wind turbines 12a and 12b are essentially identical and are best illustrated in FIGS. 2 and 3, it being noted that various components of the wind energy conversion system described and/or illustrated herein have been omitted from FIGS. 1A and 1B for the sake of clarity. FIG. 3 depicts the upper wind turbine 12a but is also applicable to the lower wind turbine 12b. Each wind turbine 12a and 12b comprises a blade assembly including an inner circumferential rim 24 having the rotation axis 15 as its central axis, an outer circumferential rim 25 concentric with the inner rim 24, and a plurality of blades 26 extending between the inner and outer rims radial to the rotation axis 15. The blade assemblies are spaced from one another along the vertical rotation axis 15, with each blade assembly rotating in a horizontal plane perpendicular or essentially perpendicular to the rotation axis 15. The horizontal planes of rotation for the blade assemblies of the upper and lower wind turbines 12a and 12b are therefore in spaced parallel relation. The blade assemblies for the upper and lower wind turbines 12a and 12b are essentially identical to one another, but the blades for the upper wind turbine 12a have a pitch angle oriented in opposition to the pitch angle of the blades of the lower wind turbine 12b such that the blade assemblies for the upper and lower wind turbines are rotated in opposite directions about the rotation axis 15 by air flowing through the blade assemblies. As shown by arrows in FIG. 2, the blade assembly for the upper wind turbine 12a, i.e. the upper blade assembly, rotates counterclockwise about the rotation axis 15 while the blade assembly for the lower wind turbine 12b, i.e. the lower blade assembly, rotates clockwise about the rotation axis 15. The use of counter-rotating wind turbines is advantageous for reducing torque on tower 14. As shown in FIG. 2, which shows fewer blades than FIG. 3, each blade 26 has a cross-sectional configuration of an air foil with a thicker leading edge facing the direction of rotation and a thinner trailing edge. As seen in FIGS. 2 and 3, each blade 26 has a width that tapers from an outer end to an inner end of the blade, and the annular area between the outer and inner rims 24 and 25 of each blade assembly presents spaces 27 alternating with the blades 26. Each blade 26 may be economically constructed as an outer skin or layer of aluminum, fiberglass or molded plastic filled with expandable foam for rigidity.

Each blade 26 is mounted on a control rod 28 disposed radial to the rotation axis 15. The control rods 28 pass through the blades 26, respectively, and each control rod 28 defines a pitch axis 29, radial to the rotation axis 15, about which the corresponding blade is rotatable to adjust the blade pitch angle as explained further below. The blades 26 for each blade assembly are disposed within the annular area defined between the outer rim 25 and the inner rim 24 of the blade assembly, with the pitch axes 29 at equally spaced radial locations about the rotation axis 15 as best seen in FIG. 3. The number of blades 26 for each blade assembly may vary and, as depicted in FIG. 3, each blade assembly may have ten blades 26 and ten spaces 27 alternating with the blades 26. Preferably, the spaces 27 for each blade assembly account for about 50 percent of the area between the inner rim 24 and the outer rim 25. The inner rim 24 for each blade assembly circumscribes a void as virtually no power is produced at the short radius, low torque position. A control drum 30 is disposed within and fills both voids and is secured to the tower. When only one turbine is employed, the blade assembly may consist of a full compliment of blades without spaces 27.

A spinner 31 extends above the blade assembly for the upper wind turbine 12a. The spinner 31 and the control drum 30 are coaxial, with the spinner 31 being configured to present minimum aerodynamic resistance and preferably having the configuration of a rocket nosecone. The control drum 30 is disposed in the voids circumscribed by the inner rims 24 of the blade assemblies coaxial with the rotation axis 15. The spinner 31 is attached to one of the blade assemblies and rotates therewith. Preferably, the control drum 30 is a hollow structure for enhanced rotation and reduced drag and weight.

As shown in FIG. 2 spinner 31 may be attached to the blade assembly for the upper wind turbine 12a for rotation therewith, and the spinner can be attached to the blade assembly in various ways including the use of fasteners 34. The fasteners 34 may be bolts as shown in FIG. 2 or any other suitable fasteners to join spinner 31 to the upper surface of inner rim 24. The bolts may extend through a shoulder of spinner 31 and into the inner rim 24. As shown in FIG. 2, a support 32 is concentrically disposed within the control drum 30 with there being a mating thread between the control drum 30 and the support 32 as explained further below. The control drum 30 may be rotatable relative to the support 32, which may be rigidly connected to a stem 41 fixed to the tower 14. The spinner 31 deflects intake air in the hood 16 toward the blades 26 for maximum turbine efficiency. The sizes of the voids and spinner are calculated as the trade-off between potential capacity of the voided area and the added cost and weight for the spinner.

As shown in FIGS. 1A and 1B, the tower 14 comprises a frame 36 supporting the upper and lower wind turbines 12a and 12b, a base 37 supporting the frame 36 in an elevated position above the ground, and guy cables 38 providing additional support and/or stability to the frame 36 and/or the base 37. The base 37 is vertical and coaxial with the rotation axis 15. The base 37 may be designed in various ways with external or internal reinforcement. The frame 36 may be designed in various ways of various configurations presenting openings for the discharge of exhaust air from exhaust plenum 20 as explained further below. The frame 36 preferably comprises three or more frame members 36' and an essentially cylindrical containment structure 39 circumscribing a containment area for the upper and lower wind turbines 12a and 12b. Only part of the containment structure 39 is shown in FIGS. 1A, 1B and 2 for the sake of clarity to permit visualization of the wind turbines. The containment structure 39 may have any suitable internal configuration or parts needed to mount other components of the wind energy conversion system. The frame members 36' may include a plurality of spaced apart frame members or struts 36' supporting the containment structure 39, with spacing between the frame members 36' allowing the discharge of exhaust air. The number and location of frame members 36' may vary depending upon the size of the containment structure and/or the number and location of components to be attached to the frame 36. The frame 36 is preferably coaxial with the base 37 and rotation axis 15. The frame 36 has one or more support flanges 40 at its upper end extending in a radially outward direction. The one or more flanges 40 is/are disposed around or circumscribe an entry opening at the top of containment structure 39 providing communication with the containment area. The flange 40 may be a single flange continuous around the entry opening or a plurality of spaced apart flanges. The spinner 30 may include the stem 41 extending from the support 32 to the base 37, with the stem 41 passing through the exhaust plenum 20. The guy cables 38 may be secured between the frame 36 and/or the base 37 and the ground.

Figure 4:
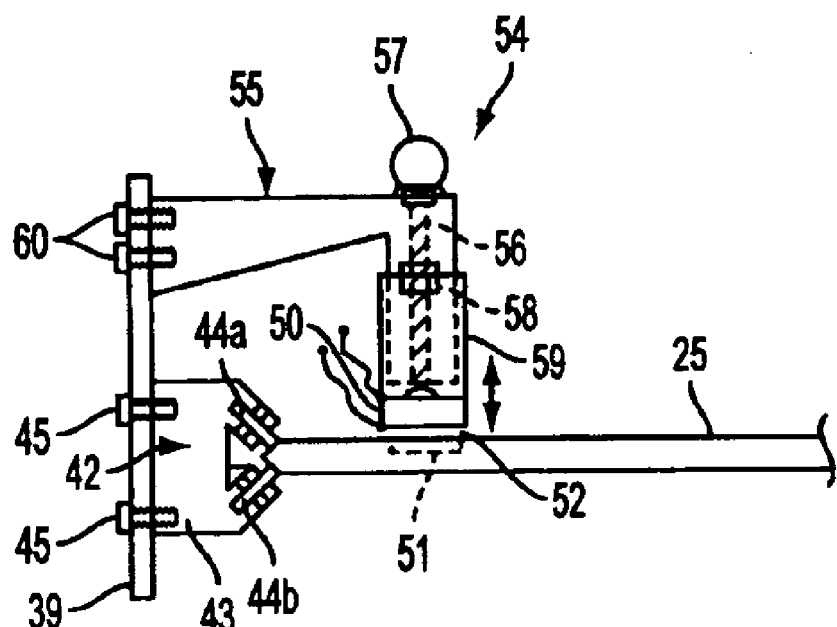
FIG. 4 is a broken side view of a wind turbine depicting an air gap adjustment mechanism.

The blade assemblies of the upper and lower wind turbines 12a and 12b are supported or mounted within the containment area of containment structure 39 for rotation in the horizontal planes about the rotation axis 15. The outer rim 25 of each blade assembly is rotatably supported or mounted by or on a plurality of mounting devices 42 secured to frame 36. Preferably, at least three mounting devices 42 are secured to the containment structure 39 about the outer rim 25 of each wind turbine 12a and 12b at spaced radial locations about the rotation axis 15. To support the weight of and ensure minimum flux in a blade assembly having a relatively large diameter outer rim 25, mounting devices 42 would advantageously be located at 2 to 4 foot intervals about the outer circumference of the outer rim 25 or as determined empirically. As best seen in FIGS. 2 and 4, each mounting device 42 comprises a bracket 43 and a pair of upper and lower rollers 44a and 44b mounted on the bracket 43. The brackets 43 are secured to the one or more frame members 39 so as to be disposed within the containment area, and the brackets 43 may be secured to the one or more frame members 39 in various ways including the use of fasteners 45. The fasteners 45 may comprise bolts extending through the one or more frame members 39 and into the brackets or may comprise any other suitable fasteners. Each bracket 43 has a pair of upper and lower arms respectively mounting the upper and lower rollers 44a and 44b at opposing 45 degree angles to the horizontal plane of rotation of the corresponding blade assembly. The upper and lower rollers 44a and 44b may be rotatably mounted on respective axles having ends secured, respectively, to the upper and lower arms of the bracket 43.

The upper and lower rollers 44a and 44b for each mounting device 42 cooperate to support the corresponding outer rim 25. As shown in FIG. 2, the outer rim 25 of each wind turbine 12a and 12b is tapered along its outer circumference to present upper and lower outer circumferential surfaces angled toward one another from the upper and lower surfaces, respectively, of the outer rim at 45 degree angles to meet at an outer circumferential edge. The outer circumferential edge of each outer rim 25 is positioned between the upper and lower rollers 44a and 44b of each associated mounting device 42 for respective sliding engagement of the upper and lower outer circumferential surfaces with the upper and lower rollers 44a and 44b of the mounting device.

Each outer rim 25 is thusly supported and guided for rotation in its horizontal plane of rotation as permitted due to rotation of the upper and lower rollers 44a and 44b about their respective axles. The outer circumferential edge of each outer rim 25 is captured between the upper and lower rollers 44a and 44b of the corresponding mounting devices 42, whereby each blade assembly is supported and positioned vertically and horizontally while being capable of rotation in its horizontal plane in response to air passing through the blade assembly.

The blade assemblies are vertically spaced from one another with their horizontal planes of rotation in parallel relation. A plurality of straightener vanes or stabilizers 82 may extend vertically between the blade assemblies radial to the rotation axis 15. The vanes 82 may be attached to the containment structure 39 as shown in FIG. 2. A brake 35 may be provided for the blade assembly of each turbine 12a and 12b as shown in FIG. 3 for the upper wind turbine 12a, it being noted that containment structure 39 and mounting devices 42 are not shown in FIG. 3 for the sake of simplicity. The brake 35 may including a brake element 46 selectively engageable with the outer rim 25 with a frictional contact to slow or stop the rotation of the blade assembly.

Each wind turbine 12a and 12b includes a stator 48 supported on the containment structure 39 and a rotor 49 carried by the blade assembly for rotation past the stator 48 to produce an electric current output. As best shown in FIG. 3, the stator 48 for each wind turbine 12a and 12b comprises one or more stator elements 50 such as one or more stator coils. The rotor 49 for each wind turbine 12a and 12b comprises one or more rotor elements 51, preferably one or more permanent magnets. The rotor elements 51 are illustrated in FIGS. 2 and 3 as permanent magnets carried in recesses along the upper surfaces of the outer rims 25, but the rotor elements 51 could be carried in recesses along the lower surfaces of the outer rims. A plurality of rotor elements 51 is provided for each outer rim 25 at spaced radial locations about the rotation axis 15 and, as shown in FIG. 3, the rotor elements 51 are provided at equally spaced radial locations about the rotation axis 15. The number of rotor elements 51 for each wind turbine 12a and 12b may vary, with the outer rim 25 of the upper wind turbine 12a being shown by way of example in FIG. 3 with thirty six permanent magnets as the rotor elements 51. The rotor elements 51 for each wind turbine 12a and 12b are thusly arranged in a circle on the corresponding outer rim 25 and rotate about the rotation axis 15 in a circular rotational path of movement disposed in a horizontal plane.

Each wind turbine 12a and 12b has its stator elements 50 in vertical alignment with the rotational path of movement of its rotor elements 51. The number of stator elements 50 for each wind turbine can vary and, as shown in FIG. 3, each wind turbine 12a and 12b can have three stator coils as the stator elements 50 at spaced locations along the rotational path of movement of the corresponding rotor elements 51 and in close proximity to the corresponding rotor elements 51. The stator elements 50 may be disposed at equally spaced radial locations about the rotation axis 15 as also shown in FIG. 3. A stator element 50 comprising a single stator coil extending continuously along the rotational path of movement of the corresponding rotor elements 51 and in close proximity to the corresponding rotor elements 51 could be provided for each wind turbine; however, the use of a plurality of shorter length stator coils spaced apart from one another and disposed at discrete locations along the rotational path of movement of the rotor elements allows materials, weight and cost to be reduced. As the blade assemblies rotate in the horizontal planes about the vertical rotation axis 15, the velocity of the rotor elements 51 pass the corresponding stator elements 50 induces an electromotive (emf) force which causes electric current to be generated in the stator elements 50, which are electrically coupled to electrical device 22 forming an electric circuit. Direct current is produced when the rotor elements 51 are rotated past the stator elements 50 with the same pole (north or south) in the same direction.

As best illustrated in FIG. 4, the stator elements 50 for each wind turbine 12a and 12b are mounted on or supported by the containment structure 39 with an air gap 52 between the stator elements 50 and the corresponding rotor elements 51 that come into vertical alignment with the stator elements as the rotor elements rotate therepast. In the illustrated embodiment, in which the rotor elements 51 are disposed along the upper surfaces of the outer rims 25, the stator elements 50 for the upper wind turbine 12a are disposed directly above the upper surface of the outer rim 25 of the upper wind turbine 12a in vertical alignment with the rotational path of movement for the corresponding rotor elements 51, and the stator elements 50 for the lower wind turbine 12b are disposed directly above the upper surface of the outer rim 25 of the lower wind turbine 12b in vertical alignment with the rotational path of movement for the corresponding rotor elements 51. It should be appreciated that, where the rotor elements 51 are mounted along the lower surfaces of the outer rims 25, the stator elements 50 can be disposed directly below the lower surfaces of the outer rims 25, respectively. The stator elements 50 can be mounted to the containment structure 39 in various ways to provide an air gap 52 of fixed or variable size.

FIG. 4 illustrates an air gap adjustment mechanism 54 for mounting a stator element 50 to the containment structure 39 in a manner permitting adjustment of the size of the air gap 52 between the stator element 50 and the corresponding rotor elements 51 that come into vertical alignment with the stator element as the blade assembly rotates about the vertical axis of rotation. The air gap adjustment mechanism 54 includes a support 55 secured to the frame member 39, a drive screw 56 carried by the support 55, an air gap control motor 57 for rotatably driving the drive screw 56, a captive drive nut 58 carried by the drive screw 56 for rotation therewith, and a housing 59 attached to the drive nut 58 and keyed to the support 55 such that the housing cannot rotate. The support 55 can be designed in various ways and, as shown in FIG. 4, the support 55 is designed as a hanger having a horizontal arm extending inwardly from the containment structure 39 in a direction radial to the vertical rotation axis 15 and a vertical arm depending from an inner end of the horizontal arm. An outer end of the horizontal arm is secured to the containment structure 39, and the horizontal arm can be secured to the containment structure in various ways such as using one or more bolts or any other suitable fasteners 60. The drive screw 56 extends within the vertical arm with its central longitudinal axis parallel to the vertical rotation axis 15. An end of the drive screw 56 extends through the drive nut 58 into the housing 59, which is slidably disposed on a lower end of the vertical arm. The housing 59 has a bottom end carrying the stator element 50 and is positioned by the support 55 such that the stator element 50 is in vertical alignment with the rotational path of movement for the corresponding rotor elements 51. The support 55 and housing 59 position the stator element 50 in close proximity to the rotor elements 51 that come into vertical alignment with the stator element 50 but with an adjustable air gap 52 between the stator element 50 and a rotor element 51 vertically aligned therewith. The housing 59 is capable of vertical movement relative to and along the vertical arm of the support 55, the housing 59 being movable upwardly and downwardly in a vertical direction parallel to the vertical rotation axis 15, i.e. along the central longitudinal axis of the drive screw 56, as shown by an arrow in FIG. 4.

Since the housing 59 is prevented from rotating, rotation of the drive screw 56 in a first direction, e.g. clockwise, by the air gap control motor 57 causes the housing to move vertically upwardly along the central longitudinal axis of the drive screw 56 and the stator element 50 moves therewith to increase the size of the air gap 52 between the stator element 50 and the rotor element 51 vertically aligned therewith. Conversely, rotation of the drive screw 56 by the air gap control motor 57 in a second direction, opposite the first direction, e.g. counterclockwise, causes the housing to move vertically downwardly along the central longitudinal axis of the drive screw 56, and the stator element 50 moves therewith to decrease the size of the air gap 52 between the stator element 50 and the rotor element 51 vertically aligned therewith. The support 55 and particularly the vertical arm thereof defines a track along which the housing 59 and stator element 50 are movable toward and away from the plane of the rotational path of movement for the rotor elements 51 to selectively decrease and increase the vertical size of gap 52. In the case of air gap adjustment mechanism 54, the stator element 50 is moved along the track in a direction perpendicular to the plane of the rotational path of movement for the rotor elements 51 while remaining at a fixed location along the rotational path of movement. The air gap control motor 57 can be operated manually or automatically via suitable controls to obtain a selected size for the air gap 52. An air gap adjustment mechanism 54 may be provided for each stator element 50. The air gap adjustment mechanism 54 may be used to establish the size of the air gap 52 and the size of the air gap may remain fixed while the voltage of direct current produced by each wind turbine is allowed to vary with changing rotational speeds for the blade assemblies. The output current of varying voltage may be supplied to a battery bank, i.e. electrical device 22, and may be supplied via computer controls to an appropriate number of battery cells for charging.

Figure 5:
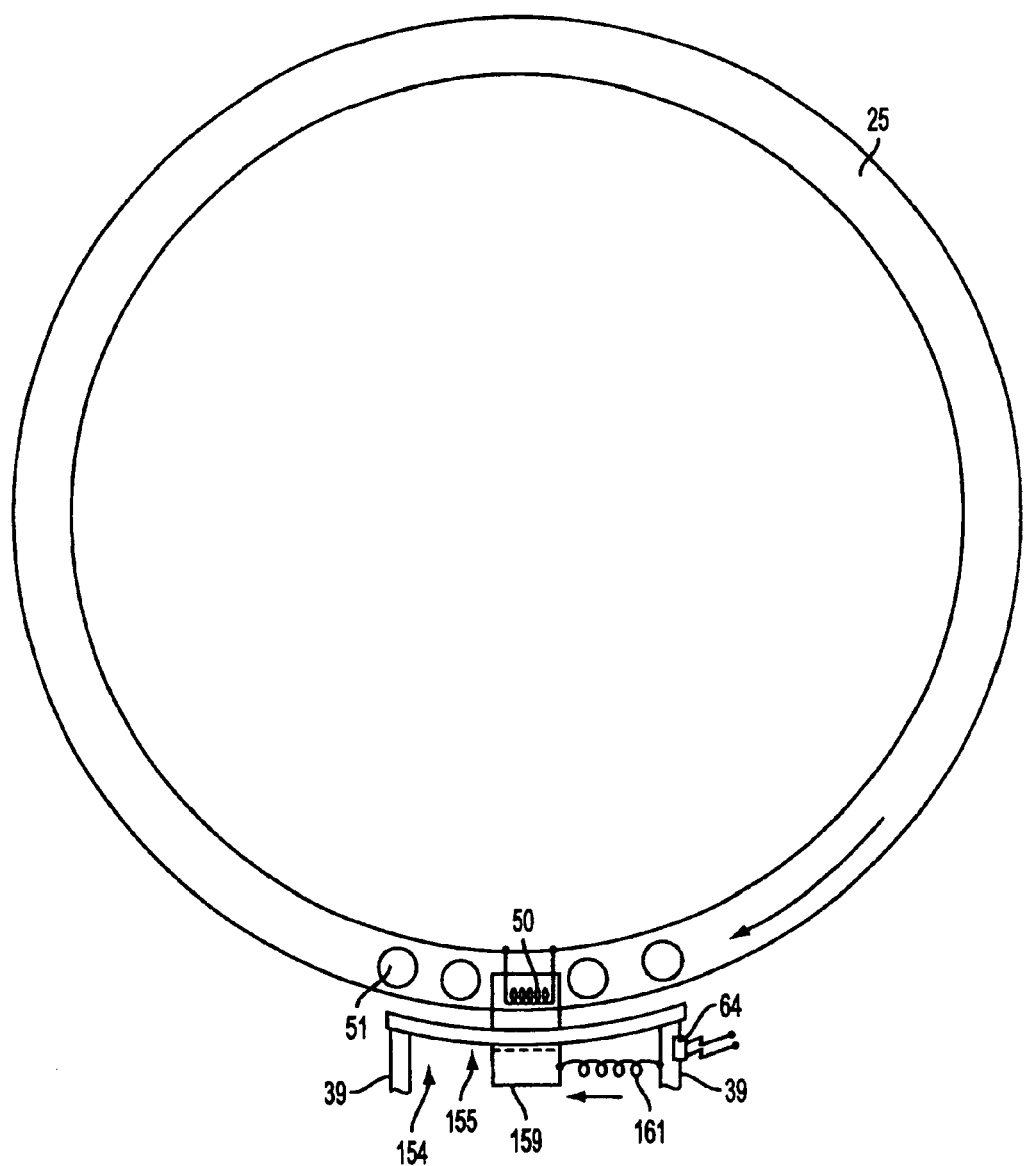
FIG. 5 is a broken top view of a wind turbine depicting an alternative air gap adjustment mechanism.
Figure 6:
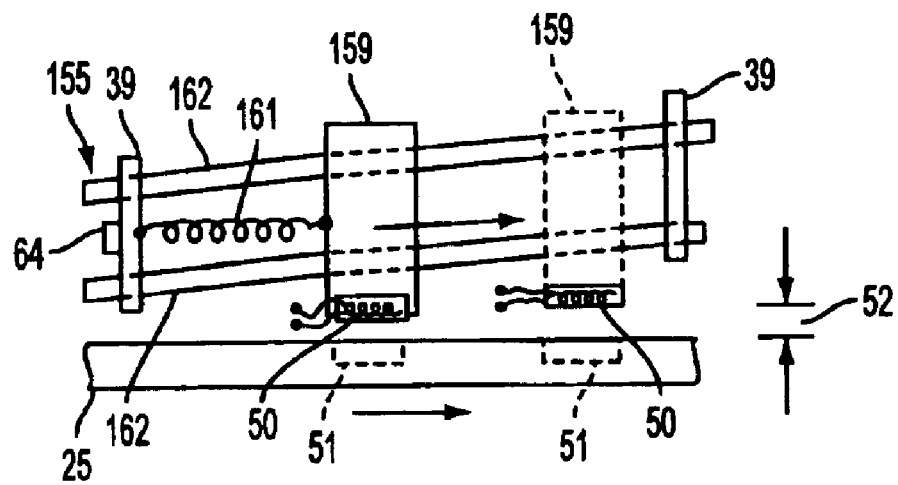
FIG. 6 is a broken view depicting the alternative air gap adjustment mechanism looking radially outwardly from the vertical axis of rotation for the wind turbines.
Figure 7:
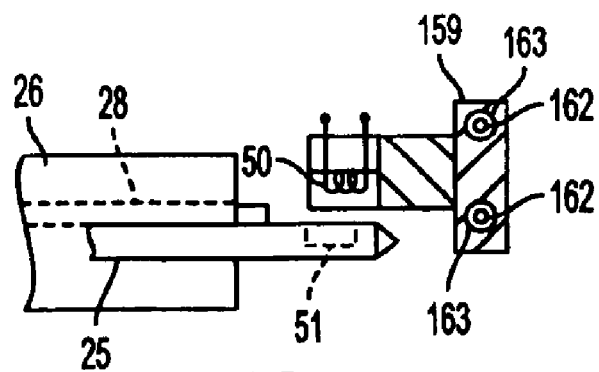
FIG. 7 is a broken view, partly in radial section, of the alternative air gap adjustment mechanism.

FIGS. 5–7 depict an alternative air gap adjustment mechanism 154 for varying the size of the air gap 52 between a stator element 50 and the rotor elements 51 that come into vertical alignment with the stator element, it being noted that various components of the wind turbine depicted in FIGS. 5–7 have been omitted for the sake of simplicity. The air gap adjustment mechanism 154 provides automatic output voltage control for the wind turbine and may serve as a balancing mechanism for balancing the torques produced by the wind turbines 12a and 12b as explained further below. The air gap adjustment mechanism 154 comprises a support 155 secured to containment structure 39, a housing 159 disposed on the support 155 for movement in an arcuate path, and a resilient restraining member 161 for the housing 159. The support 155 defines a stationary track for the housing 159 along the arcuate path, with the track following the curvature of the rotational path of movement for the corresponding rotor elements 51. The track can be designed in various ways and may comprise one or more cam rods 162 each having first and second ends secured to containment structure 39 and an arcuate configuration between the first and second ends corresponding to the arcuate path of movement for the housing 159. As best seen in FIGS. 6 and 7, the support 155 comprises a pair of vertically aligned and parallel cam rods 162. The cam rods 162 and, therefore, the track defined thereby are non-parallel to the horizontal plane of the rotational path of movement for the corresponding rotor elements 51 and are angled upwardly from their first ends to their second ends relative to this horizontal plane as best seen in FIG. 6.

The housing 159 is slidable along the track defined by cam rods 162 for movement therealong in the arcuate path. The housing 159 can be disposed on the track in various ways and, in the illustrated embodiment, the cam rods 162 pass through respective bores in the housing 159. The bores may each be fitted with a bearing 163 receiving the corresponding cam rod 162 therethrough. The stator element 50 is disposed on and carried by the housing 159. When the housing 159 is slidably disposed on the cam rods 162, the stator element 50 is positioned in vertical alignment with the rotational path of movement of the rotor elements 51, with there being an air gap 52 between the stator element 50 and the rotor elements 51 that come into vertical aligned therewith. The air gap 52 is variable in size in that the upward angle of the track defined by cam rods 162 results in the vertical size of the air gap 52 increasing as the housing 159 moves forwardly along the track, i.e. in the direction of the second ends of the cam rods, and decreasing as the housing 159 moves rearwardly along the track, i.e. in the direction of the first ends of the cam rods. The forward direction of movement for the housing 159 corresponds to the rotational direction, i.e. clockwise or counterclockwise, for the outer rim 25 of the corresponding blade assembly.

The restraining member 161 applies a resilient force in the rearward direction against the housing 159 to resist movement of the housing in the forward direction along the track defined by cam rods 162. The restraining member 161 can be designed in various ways to apply the rearward force and may include a spring as shown in FIGS. 5 and 6. The spring may comprise a coil spring located to the rear of the housing 159 and having opposing ends attached to the housing 159 and the containment structure 39, respectively. It should be appreciated that other types of springs may be used as the restraining member 161.

The rotor elements 51 are rotated in the forward direction by the outer rim 25 rotating in the forward direction. The outer rim 25 depicted in FIGS. 5–7 corresponds to the outer rim of the lower wind turbine 12b, in which case the forward direction is clockwise as shown by arrows in FIG. 5. The arrows shown in FIG. 6 to indicate the clockwise forward direction are reversed from the arrows of FIG. 5 since FIG. 6 depicts the inner circumference of the outer rim 25 looking radially outwardly from the rotation axis 15. In the case of the outer rim 25 of the upper wind turbine 12a, the forward direction would be counterclockwise. As the rotor elements 51 are rotated in the forward direction past the stator element 50 carried by housing 159, the counter electromotive force (emf) of the stator element 50 resists the forward motion of the rotor elements 51. Drag is induced and is applied to the housing 159 as a force in the forward direction. Where the forward drag force on the housing 159 does not exceed the rearward restraining force of the restraining member 161 on the housing 159, the housing 159 and the stator element 50 carried thereon are restrained from movement in the forward direction along the track defined by cam rods 162 such that the vertical size of the air gap 52 is maintained. As the rotational speed of the blade assembly increases, the emf drag increases. Where the forward drag force on the housing 159 increases to the extent that it overcomes the rearward restraining force on the housing 159 from restraining member 161, the housing 159 moves forwardly along the track defined by cam rods 162, and the stator element 50 moves correspondingly with the housing as depicted in FIG. 6. Movement of the housing 159 and stator element 50 forwardly along the track from a first position to a second position causes an increase in the vertical size of the air gap 52 since the housing 159 and stator element 50 move upwardly relative to and away from the plane of the rotational path of movement of the rotor elements 51 due to the angle of the track defined by cam rods 162. When the drag force on the housing 159 no longer exceeds the rearward force of the restraining member 161, as when the rotational speed of the blade assembly slows down, the resiliency of the restraining member 161 automatically moves the housing 159 and stator element 50 rearwardly along the track defined by cam rods 162 from the second position toward the first position such that the air gap 52 decreases in size as the stator element 50 moves downwardly relative to and toward the plane of the rotational path of movement of the rotor elements 51. Where the restraining member 161 is a coil spring, forward movement of the housing 159 from the first position to the second position causes the spring to stretch or elongate, and rearward movement of the housing from the second position toward the first position causes the spring to contract. Movement of the housing 159 and stator element 50 along the track defined by cam rods 162 is non-perpendicular to the plane of the rotational path of movement for the rotor elements 51 in that movement of the housing and stator element along the track occurs in a direction at an acute angle to the plane of the rotational path of movement. Also, the stator 50 does not remain at a fixed location along the rotational path of movement as it moves along the track. Rather, the stator element 50 moves along the rotational path of movement while also moving upwardly/downwardly relative to the plane of the rotational path of movement, and the arcuate configuration of the track ensures that the stator element 50 remains vertically aligned with the rotational path of movement. Increasing and/or decreasing the vertical size of the air gap 52 in response to changes in rotational speed of the blade assembly restricts voltage changes in the output current produced by the wind turbine as a result of changing rotational speeds. An air gap adjustment mechanism 154 can be provided for each stator element 50 of each wind turbine 12a and 12b. Additional computer controls can be used to allow air gap control to regulate turbine rpm.

The wind energy conversion system 10 may include monitors 64 for monitoring and controlling torque created by the wind turbines 12a and 12b, and the monitors 64 may comprise strain gages as shown in FIGS. 5 and 6. Preferably one or more monitors 64 such as strain gages is/are provided for each wind turbine 12a and 12b. The monitor 64 for each wind turbine 12a and 12b may be deployed in various ways and at various locations to monitor torque. In the arrangement depicted in FIGS. 5 and 6, the monitor 64 is disposed on containment structure 39 adjacent the connected end of the restraining member 161 and provides a measurement of turbine torque as applied to the containment structure. Another way of monitoring turbine torque can be accomplished by measuring the wattage (voltage×current) of the electrical output of each wind turbine 12a and 12b using suitable instruments. It is preferred that torque be monitored for each wind turbine 12a and 12b using both a strain gage and wattage measurements. Monitoring turbine torque allows the torques produced by the upper and lower wind turbines 12a and 12b to be balanced to avoid a net torque being applied to the tower 14. Balancing the torques of the upper and lower wind turbines 12a and 12b is also achieved by adjusting the size of the air gaps 52 of the upper and lower wind turbines as explained above and/or adjusting the turbine blade pitch angle as explained further below.

Figure 8:
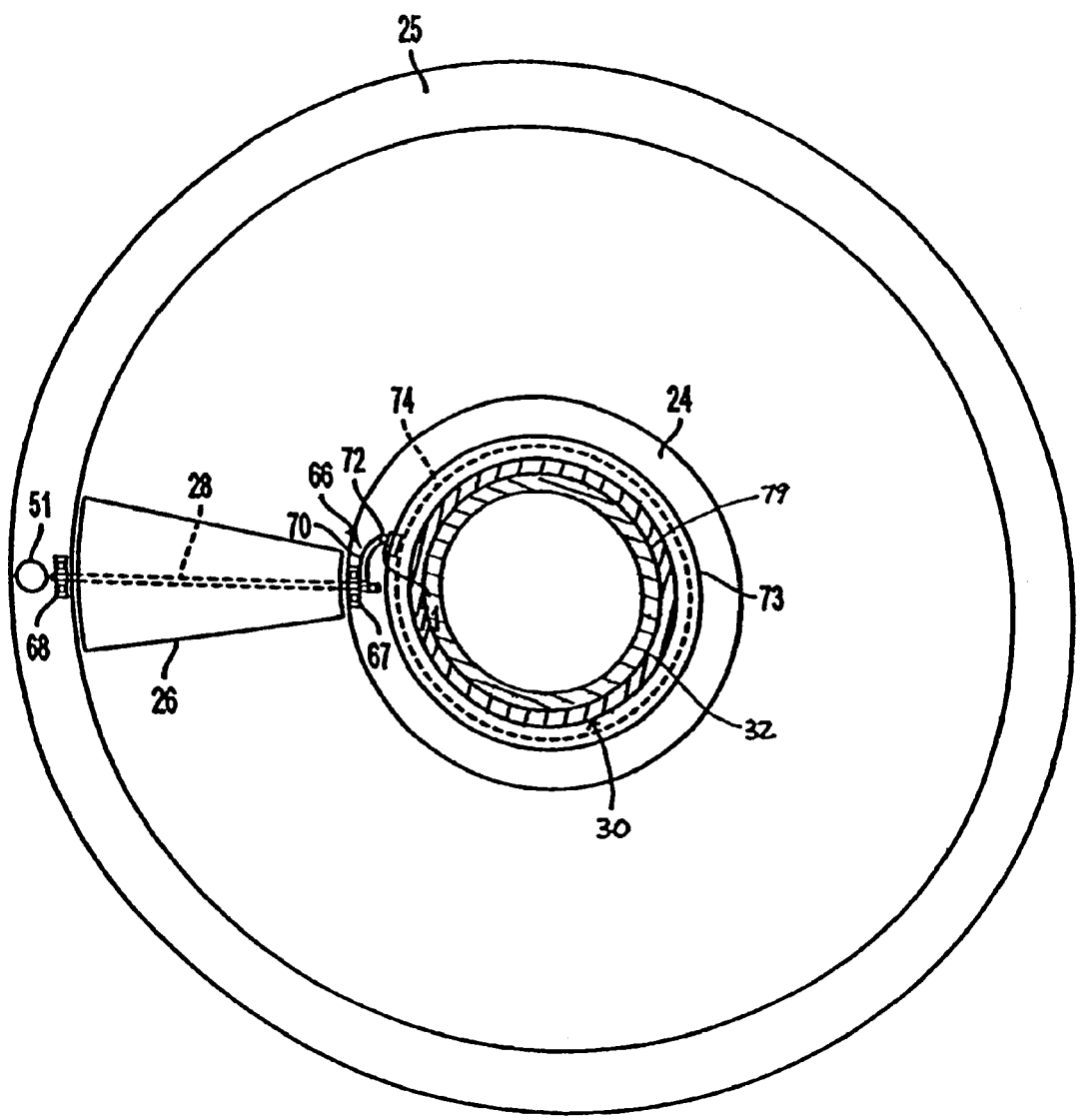
FIG. 8 is a top view of a wind turbine illustrating a blade pitch adjustment mechanism with the associated blade in a minimum pitch angle position.
Figure 9:
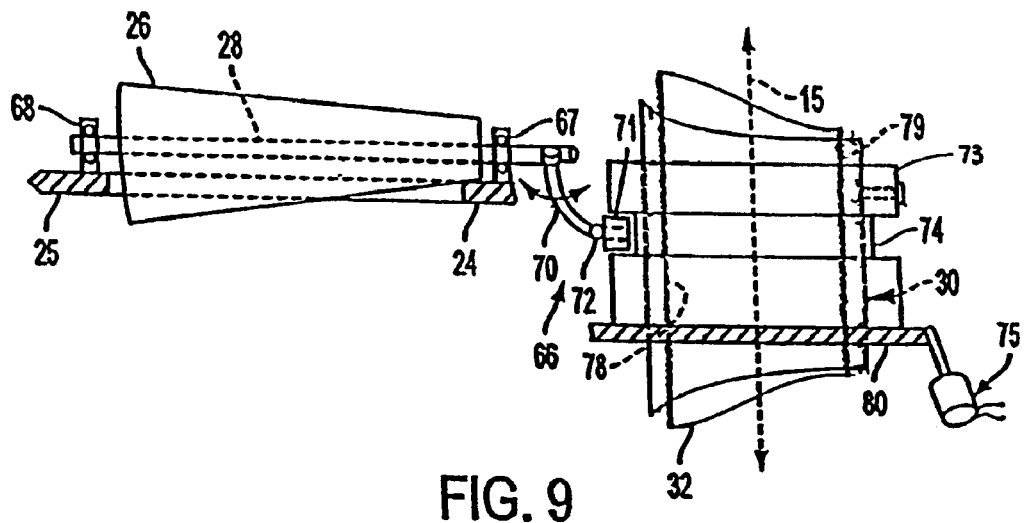
FIG. 9 is a broken side view of the blade pitch adjustment mechanism with the associated blade in a maximum pitch angle position.
Figure 10:
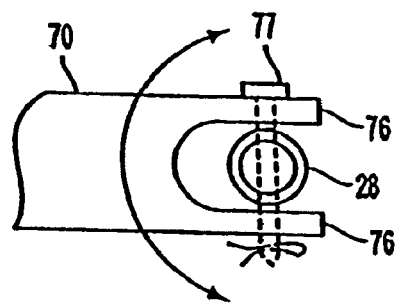
FIG. 10 is a broken view illustrating attachment of a link of the blade pitch adjustment mechanism to a control rod of the associated blade.

A blade pitch adjustment mechanism 66 for selectively adjusting blade pitch angle is depicted in FIGS. 8–10 and may be used as a balancing mechanism to balance the torques produced by the upper and lower wind turbines. As shown in FIGS. 8–10, the control rod 28 for each blade 26 is preferably hollow and has inner and outer ends extending beyond the inner and outer ends, respectively, of the blade 26. The inner and outer ends of the control rod 28 are supported to permit rotation of the control rod 28 about its central longitudinal axis, i.e. the pitch axis 29 shown in FIG. 3. The inner and outer ends of the control rod 28 may be rotatably supported in inner and outer bearings 67 and 68, respectively, mounted on the inner and outer rims 24 and 25, respectively, of the blade assembly. As depicted in FIGS. 8 and 9, the bearings 67 and 68 may be mounted on the upper surfaces of the inner and outer rims 24 and 25, respectively. A portion of the inner end of the control rod 28 protrudes beyond the inner bearing 67 in the direction of the vertical rotation axis 15. The blade 26 is secured to its control rod 28 and rotates therewith when the control rod is rotated about its central longitudinal axis, the blade 26 rotating within the annular area between the inner and outer rims 24 and 25. The control rod 28 is located to be passive in that the area of blade 26 disposed on each side of its control rod is equal, and the air pressure cancels torque forces on the control rod.

The blade pitch adjustment mechanism 66 comprises a link 70 having a first end connected to the inner end of the control rod 28 and a second end connected to a cam follower 71, a swivel joint 72 connecting the second end of the link 70 to the cam follower 71, a cam 73 fastened to the control drum 30 and having a groove 74 in its outer surface within which the cam follower 71 is captured, and an actuator 75 for actuating the cam 73 to move the cam follower 71 within groove 74. The first end of link 70 is fixedly connected to the inner end of the control rod 28, and the first end of the link may be fixedly connected to the inner end of the control rod in various ways. As best shown in FIG. 10, the first end of the link 70 may be bifurcated to define a pair of parallel fingers 76 and the inner end of the control rod 28 that protrudes beyond the inner bearing 67 may be disposed between the fingers 76 with a close fit. A securing element 77 secures the inner end of control rod 28 in place between the fingers 76. The link 70 has an arcuate longitudinal configuration with an inward curvature facing the vertical rotation axis 15 and has an arcuate central longitudinal axis disposed in a plane. The cam follower 71 comprises a roller that is rotatable about a central axis radial to rotation axis 15, thusly enabling the cam follower 71 to slide along the groove 74. The swivel joint 72 that connects the second end of link 70 to the cam follower 71 allows the link to rotate or pivot relative to the cam follower 71 about a pivot axis radial to the vertical rotation axis 15. The cam 73 comprises a cylindrical cam sleeve disposed concentrically over the control drum 30 and fastened thereto as shown in FIG. 9. The groove 74 is a circumferential groove along the exterior surface of the cam 73 and oriented perpendicular to the rotation axis 15. The cam follower 71 is disposed in the groove 74 with a close fit while being slidable within the groove in a circumferential direction about the vertical rotation axis 15. The cam 73 fastens to control drum 30 which has an internal thread 78 in cooperative threaded engagement with an external thread 79 along the support 32 of the spinner 30, and these threads may be Acme threads. Of course, it should be appreciated that the control drum 30 may be provided with the cam groove 74 and may thusly form the cam 73. The threaded coupling or engagement between the control drum 30 and the support 32 results in vertical movement of the control drum 30, and cam 73 therewith, relative to and along the support 32 in response to rotation of the control drum 30 and/or cam 73 relative to the support 32 and about the vertical rotation axis 15. Rotation of the control drum 30 and/or cam 73 relative to the support 32 in a first direction, e.g. clockwise, about the vertical rotation axis 15 causes vertical movement of the cam 73 along support 32 in a first vertical direction, e.g. upwardly. Rotation of the control drum and/or cam 73 relative to the support 32 in a second direction, e.g. counterclockwise, opposite the first direction and about the vertical rotation axis 15 causes vertical movement of the cam along support 32 in a second vertical direction, e.g. downwardly, opposite the first vertical direction. The actuator 75 effects rotation of the control drum 30 and/or cam 73 relative to the support 32 in the first and second rotational directions and may comprise a cam control motor. The cam control motor may be used to impart rotation to the cam 73 by rotatably driving a drive ring 80 attached to the cam 73, and the drive ring may be driven via a worm screw driven by the cam control motor. A spring, such as a spiral spring, may be provided at the first end of the link 70 or at any other suitable location to provide a spring force to maintain the cam follower 71 in engagement with the groove 74.

FIG. 9 shows the cam 73 in a first vertical position along the support 32 corresponding to a first rotational position for the link 70 in which the plane containing the central longitudinal axis of the link is vertical, is radial to the vertical rotation axis 15 and is perpendicular to the corresponding outer rim 25. In this position, the blade 26 mounted on the control rod 28 is at a maximum pitch angle and may be considered as being in a fully open blade position or maximum pitch angle position. The cam follower 71 is engaged in groove 74, which is in a first vertical position vertically spaced below the control rod 28. In order to change the pitch of blade 26, the actuator 75 is actuated to effect rotation of the cam 73 about the vertical rotation axis 15 in the direction needed to cause movement of the cam 73 upwardly along and relative to the support 32, as permitted by the threaded coupling between the control drum 30 and the support 32. As the cam 73 moves upwardly, the cam follower 71 slides within the groove 74, causing the link 70 to rotate or pivot about its pivot axis as permitted by swivel joint 72. FIG. 8 illustrates the cam 73 moved upwardly to a second vertical position along the support 32 corresponding to a second rotational position for the link 70 in which the plane containing the central longitudinal axis of the link is horizontal, is perpendicular to the vertical rotation axis 15 and is parallel to the horizontal plane of rotation of the corresponding blade assembly. In this position, the link 70 is rotated or pivoted 90 degrees from the position illustrated in FIG. 9, such that the control rod 28 and the blade 26 mounted thereon are correspondingly rotated 90 degrees about the pitch axis from the position shown in FIG. 9. The blade 26 is at a minimum pitch angle and may be considered as being in a fully closed blade position or a minimum pitch angle position. The blade 26 may be moved from the fully closed position toward the fully open position by reversing the rotation of the cam 73 to effect downward movement of the cam along the support 32. The amount of upward and downward vertical movement of the cam 73 can be selectively controlled to obtain various intermediate vertical positions for the cam 73 between the first and second vertical positions therefor. In this way, various intermediate rotational positions between the first and second rotational positions can be obtained for the link 70 to achieve various intermediate positions for the blade 26 between the fully open and fully closed blade positions.

The cam 73 can be moved longitudinally along the support 32 in various alternative ways including the use of hydraulic or pneumatic cylinders and linear screw actuators. The link 70 may pivot in both clockwise and counterclockwise directions about its pivot axis such that the blade 26 may rotate in both clockwise and counterclockwise directions about the pitch axis. A link 70 and cam follower 71 may be provided for each blade 26 of each wind turbine 12*a* and 12*b*. A separate groove 74 may be provided for each cam follower 71, or all of the cam followers 71 of a wind turbine may be disposed in the same groove 74. A single actuator 75 may be provided for both wind turbines 12*a* and 12*b*, or an actuator 75 may be provided for each wind turbine 12*a* and 12*b*. The blade pitch for wind turbines 12*a* and 12*b* may be independently adjustable. Adjusting the blade pitch allows the torque of each wind turbine 12*a* and 12*b* to be controlled and balanced to limit a net torque on the tower 14. Where the straightener vanes 82 are disposed between the upper wind turbine 12*a* and the lower wind turbine 12*b*, the straightener vanes are of a size and configuration to accommodate rotation of the blades 26 to the fully open position as shown in FIG. 2.

As illustrated in FIG. 1A, the air intake hood or snorkel 16 is fixedly or rigidly mounted on a platform 84 that is rotatably supported on the one or more flanges 40 for rotation of the platform 84 about the vertical rotation axis 15. The platform 84 includes a planar upper platform member 85 and a planar lower platform member 86 attached to the upper platform member in overlapping arrangement. The platform 84 has an opening or hole therethrough in vertical alignment over the entry opening at the top of frame 36 and is of sufficient size to provide an unobstructed path through the entry opening to the containment area and the wind turbines 12*a* and 12*b* disposed therein. The platform opening extends through the upper platform member 85 and the lower platform member 86. The upper platform member 85 may be attached to the lower platform member 86 in various ways including the use of fasteners such as bolts extending through the platform members. Of course, the upper and lower platform members 85 and 86 could be formed integrally, unitarily or monolithically such that the platform 84 may be a one piece member.

The lower platform member 86 has a circular peripheral configuration, and the lower platform member is tapered along its outer circumference with angled upper and lower circumferential surfaces as explained above for the outer circumference of the outer rims 25. A plurality of mounting devices 42 are disposed on the one or more flanges 40 with the outer circumference of the lower platform member 86 between the upper and lower rollers of the mounting devices 42. The upper and lower rollers of each mounting device 42 are in cooperative engagement with the angled upper and lower circumferential surfaces of the lower platform member 86 as explained above for the outer rims 25. The lower platform member 86 is thusly mounted on the frame 36 for rotation in a horizontal plane about the vertical rotation axis 15, with the upper platform member 85 rotating with the lower platform member. The upper platform member 85 has a peripheral configuration and size to mount the hood 16 and the rudder assembly 18 as explained further below.

The hood 16 is supported on the upper platform member 85 and is rigidly or fixedly attached to the platform 84. The hood 16 may be attached to the platform 84 using fasteners such as bolts. In this regard, the bottom of the hood 16 may be formed with an outwardly turned flange, and this flange may be bolted to the platform 84. Accordingly, the hood 16 rotates with the platform 84 about the vertical rotation axis 15. The hood 16 comprises a hollow structure extending upwardly and laterally from a discharge opening at the bottom of the hood disposed in alignment with the platform opening to an air intake opening 89 facing lateral to the vertical rotation axis 15. The hood structure may be of uniform or non-uniform cross-section between the discharge and air intake openings. Preferably, the discharge opening of the hood is circular and of sufficient peripheral size to provide unobstructed communication through the platform opening to the containment area of frame 36 within which wind turbines 12a and 12b are disposed. The intake opening 89 may be rectangular in a vertical plane, which may be parallel to the vertical rotation axis 15, and the cross-section of the hood may transition from rectangular to circular between the intake and discharge openings. The size of the intake opening is sufficiently large to provide an adequate intake of air for passage through the hood 16 and platform opening to the wind turbines 12a and 12b. The intake opening 89 may be larger than the circumference of the wind turbines, which allows the size of the wind turbines to be reduced. Mild air compression through the hood 16 increases the velocity of intake air to the wind turbines 12a and 12b and enhances power output from the wind turbines at lower wind speeds. A plurality of relief ports 90 are disposed in the outer wall of the hood 16 and may be selectively opened and closed, or opened under excess air pressure, via flaps 91, respectively. The flaps 91 may be pivotally mounted to the hood 16 and may be spring or gravity loaded so as to open the relief ports 90 and relieve excess intake air from the hood 16 above the design input for the wind turbines. The relief ports 90 also limit shear force on the tower 14 in high wind conditions and allow the wind energy conversion system 10 to continue to output maximum power in high winds.

Figure 11:
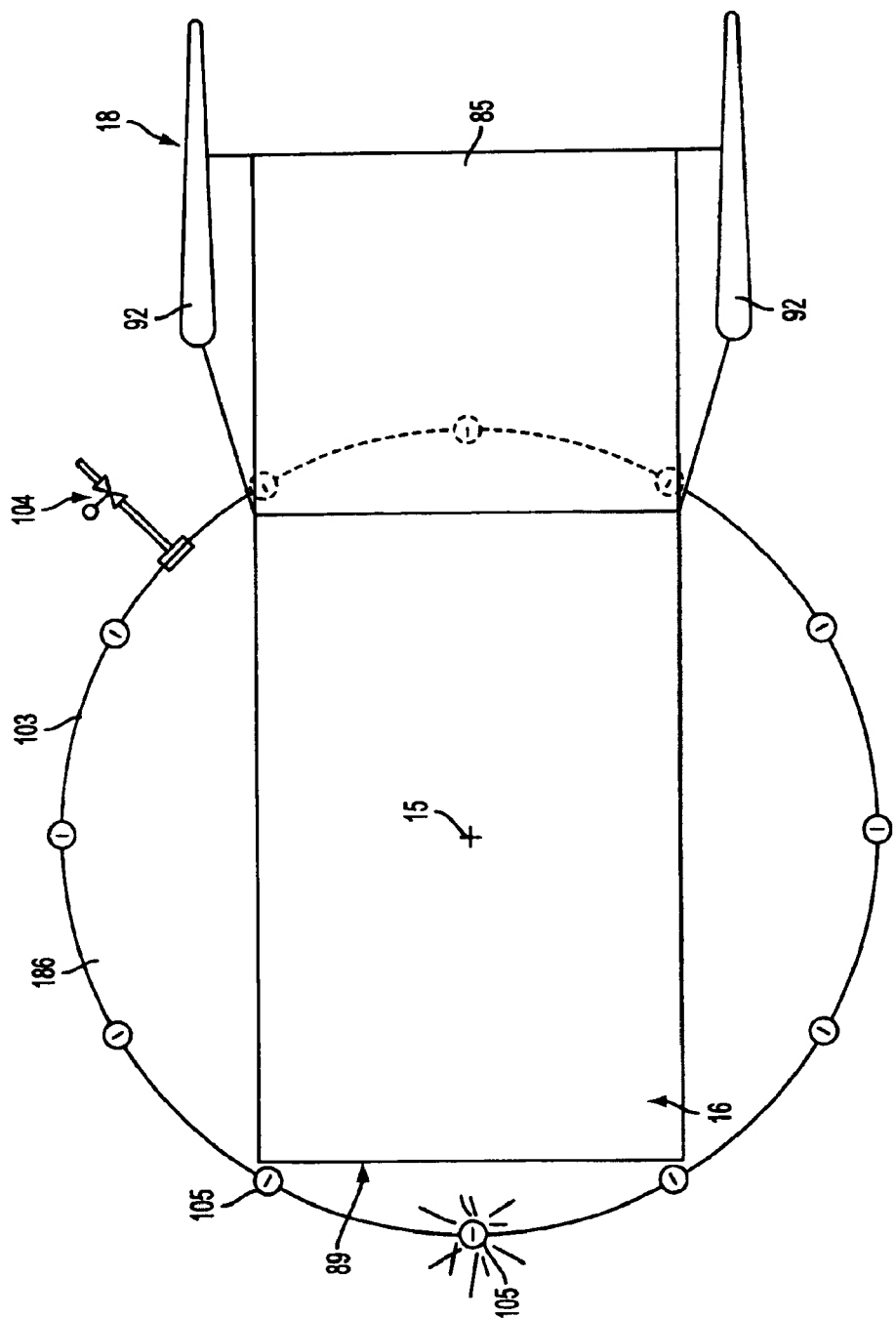
FIG. 11 is a top view of the wind energy conversion system illustrating an intake hood, a rudder assembly for the intake hood and a misting system for the wind energy conversion system.

The rudder assembly 18 maintains the intake opening 89 of the hood 16 facing the direction of oncoming wind such that the intake opening is maintained upwind, i.e. in or toward the direction from which the wind blows as shown by arrows in FIG. 1A. As best seen in FIGS. 1A, 1B and 11, the rudder assembly 18 is disposed on upper platform member 85 opposite the intake opening 89 of hood 16 and comprises a pair of rudders 92 extending upwardly from the upper platform member 85. The rudder assembly 18 is disposed on an opposite side of the rotation axis 15 from the intake opening 89, and each rudder 92 has a forward edge, a rearward edge and a top edge connecting the forward and rearward edges. The forward edges extend angularly upwardly in a direction away from the vertical rotation axis 15 at a non-perpendicular angle to the planar upper platform member 85. The rearward edges extend perpendicular to the upper platform member 85, and the top edges are parallel to the upper platform member 85. The rearward edges terminate at a vertical plane perpendicular to the upper platform member 85 and this plane is parallel to a plane containing the intake opening 89. As depicted in FIG. 1A, the rudders 92 have a torque arm distance X from the plane of rotation axis 15 that is greater than the torque arm distance Y of the hood 16 from the plane of the rotation axis 15. Also, the rudders 92 have collective surface areas greater than the surface area of the hood 16. FIG. 1A illustrates the rudder 92 having a collective surface area R1 on one side of the vertical rotation axis 15, i.e. to the right side of the vertical rotation axis as depicted in FIG. 1A. The surface area of the hood 16 as seen in FIG. 1A may be considered as comprising surface area sections R2, L1 and L2. Surface area sections R2 and L2 are symmetrical to the vertical rotation axis 15 and are equal in size on opposite sides, i.e. right and left, of the vertical rotation axis 15. Surface area section L1 is disposed on the opposite side of the vertical rotation axis 15 from the rudder surface area R1, i.e. to the left of the vertical rotation axis 15 in FIG. 1A. The surface area section L1 is smaller in size than the rudder surface area R1. Surface area section L1 provides negative yaw on the hood 16 while the rudder surface area R1 provides positive yaw thereon since the surface area sections R2 and L2 cancel and do not contribute to yaw. The positive yaw on the hood 16 is greater than the negative yaw thereon, thereby providing a net positive yaw causing rotation of the platform 84 about the vertical rotation axis 15 in accordance with directional wind conditions such that the intake opening 89 of the hood is kept facing into the oncoming wind.

The following is a representative yaw calculation for outer rims 25 that are 20 feet in diameter, a torque arm distance X of 25 feet, a torque arm distance Y of 12 feet and a rudder surface area R1 25% larger than the hood surface area section L1:

$$Yaw = R1 \times X - L1 \times Y;$$

$$Yaw = 1.25 \times 25 - 1 \times 12 = +19.25$$

Yaw is therefore positive and controlled by the rudder assembly 18 to maintain the intake opening 89 of the hood 16 facing into the wind. The rudder assembly 18 maintains the intake opening 89 upwind without the need for power consuming equipment and/or computers to direct yaw.

The exhaust plenum 20 has an annular supporting 94 at its top circumscribing an opening disposed beneath the lower wind turbine 12b. The support ring 94 is rotatably supported on containment structure 39 by a plurality of mounting devices 42 mounted on the containment structure 39 at radial locations about the vertical rotation axis 15. As described above for the outer rims 25 and the lower platform member 86, the outer circumference of support ring 94 is formed by angled upper and lower circumferential surfaces in respective engagement with the upper and lower rollers of the mounting devices 42. Accordingly, the exhaust plenum 20 is mounted on the frame 36 for rotation about the vertical rotation axis 15. The exhaust plenum 20 is rotatably supported by the frame 36 beneath the lower wind turbine 12b with the opening at the top of the exhaust plenum in vertical alignment with the containment area of frame 36 which accommodates the wind turbines 12a and 12b. The exhaust plenum 20 comprises a hollow exhaust structure that extends downwardly and laterally from its top opening to an outlet opening 95. The exhaust structure has a cross-section that increases in size between its top opening and the outlet opening 95 to promote expansion and reduce turbulence and skin drag for exhaust air through the exhaust plenum 20. The exhaust structure is configured with a flared or bell mouth at the outlet opening 95, causing external air to be deflected over the exhaust plenum and inducing a vacuum at the outlet opening 95 to assist air exhaust and reduce back pressure on the wind turbines 12a and 12b. The exhaust plenum 20 has a through hole therein appropriately located and sized for passage therethrough of the stem 41 of the support 32. The configuration for the exhaust plenum 20 depicted in FIG. 1A has a neutral impact on yaw for hood 16. However, it should be appreciated that the exhaust plenum 20 can be configured to extend further beyond the vertical rotation axis 15, to the right in FIG. 1, to provide additional structure that would provide positive yaw and assist in controlling yaw on the hood 16.

Figure 12:
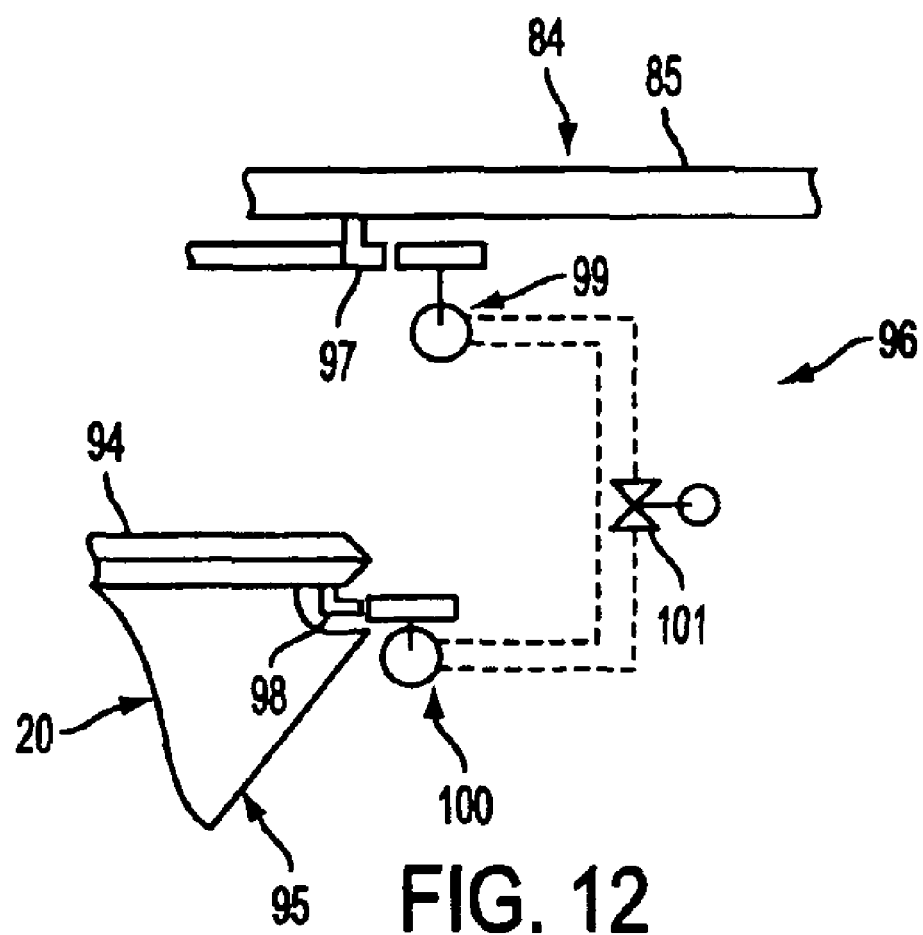
FIG. 12 is a broken fragmentary view depicting a drive mechanism for an exhaust plenum of the wind energy conversion system.

The outlet opening 95 of the exhaust plenum 20 faces a direction generally opposite the direction that the intake opening 89 faces and thusly faces downwind, i.e. in or toward the direction in which the wind blows as shown by arrows in FIG. 1A. A drive mechanism 96 is depicted in FIG. 12 for rotating the exhaust plenum 20 about the vertical rotation axis 15 in accordance with rotation of the hood 16 to maintain the outlet opening 95 facing downwind as the position of the intake opening 89 changes to face upwind. The drive mechanism 96 comprises a drive coupling 97 mounted to the platform 84, a drive coupling 98 mounted to the support ring 94 of the exhaust plenum, a hydraulic pump and motor unit including a hydraulic pump 99 operated by the drive coupling 97 to circulate fluid through a hydraulic motor 100 to drive the exhaust plenum via the drive coupling 98 in driving engagement with the motor 100. The motor 100 may be controlled via a hydraulic brake control 101. The hydraulic pump 99 circulates fluid through the motor 100 in response to rotation of the platform 84 about the vertical rotation axis 15, and the motor 100 drives the support ring 94 to rotate the exhaust plenum 20 about the vertical rotation axis 15. Various alternative drive arrangements may be used as the drive mechanism 96 including direct shaft couplings, sprockets and chains, gears, tension cables, and/or cog belts. Although a drive mechanism 96 is provided for the exhaust plenum 20, it should be appreciated that the exhaust plenum can be designed to rotate in unison with the hood 16 without a drive mechanism. Moreover, rotation of the exhaust plenum 20 can be effected independently of the hood 16 with a separate, independent drive mechanism or by designing the exhaust plenum to be self-positioning.

Figure 13:
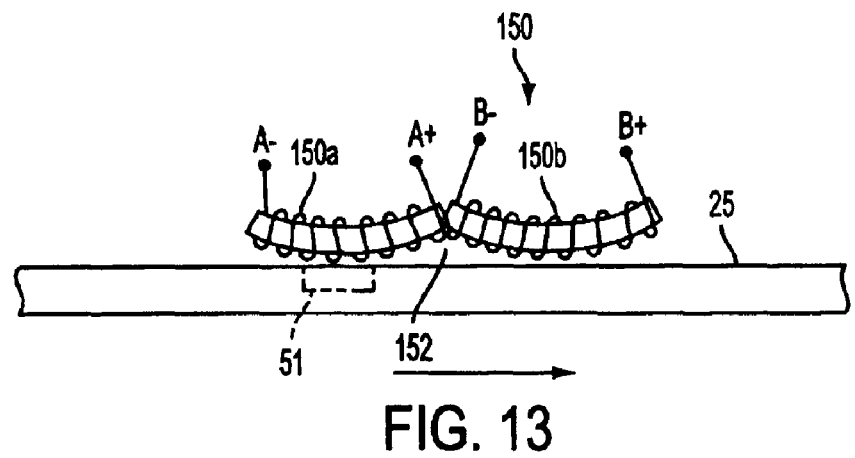
FIG. 13 is a broken view of a wind turbine depicting an alternative stator element designed to produce a power output of varying voltage.
Figure 14:
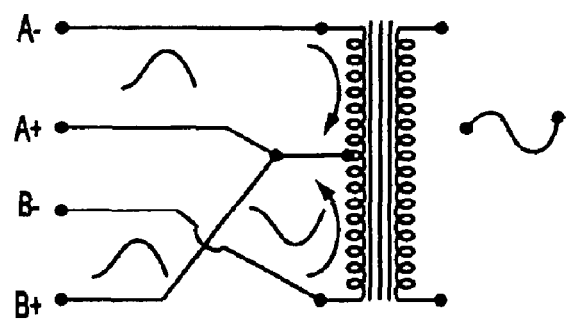
FIG. 14 represents wiring of the alternative stator element to produce alternating current.

FIGS. 13 and 14 illustrate an arrangement by which AC power may be generated by a wind turbine of the wind energy conversion system 10. FIG. 13 illustrates a stator element 150 comprising a pair of curved stator coil segments 150a and 150b extending along the rotational path of movement for rotor element 51. The curvature of the stator coil segments 150a and 150b provides an air gap 152 of non-uniform size between the stator element 150 and the plane of the rotational path of movement for the rotor element or elements 51 rotating past the stator element 150. The non-uniform or varying size of air gap 152 causes an electrical output of changing voltage to be produced. As represented in FIG. 14, the stator coil segments 150a and 150b may be wired to the electrical device 22 output with opposing function and collectively produce an electrical output having an AC sine wave.

Figure 15:
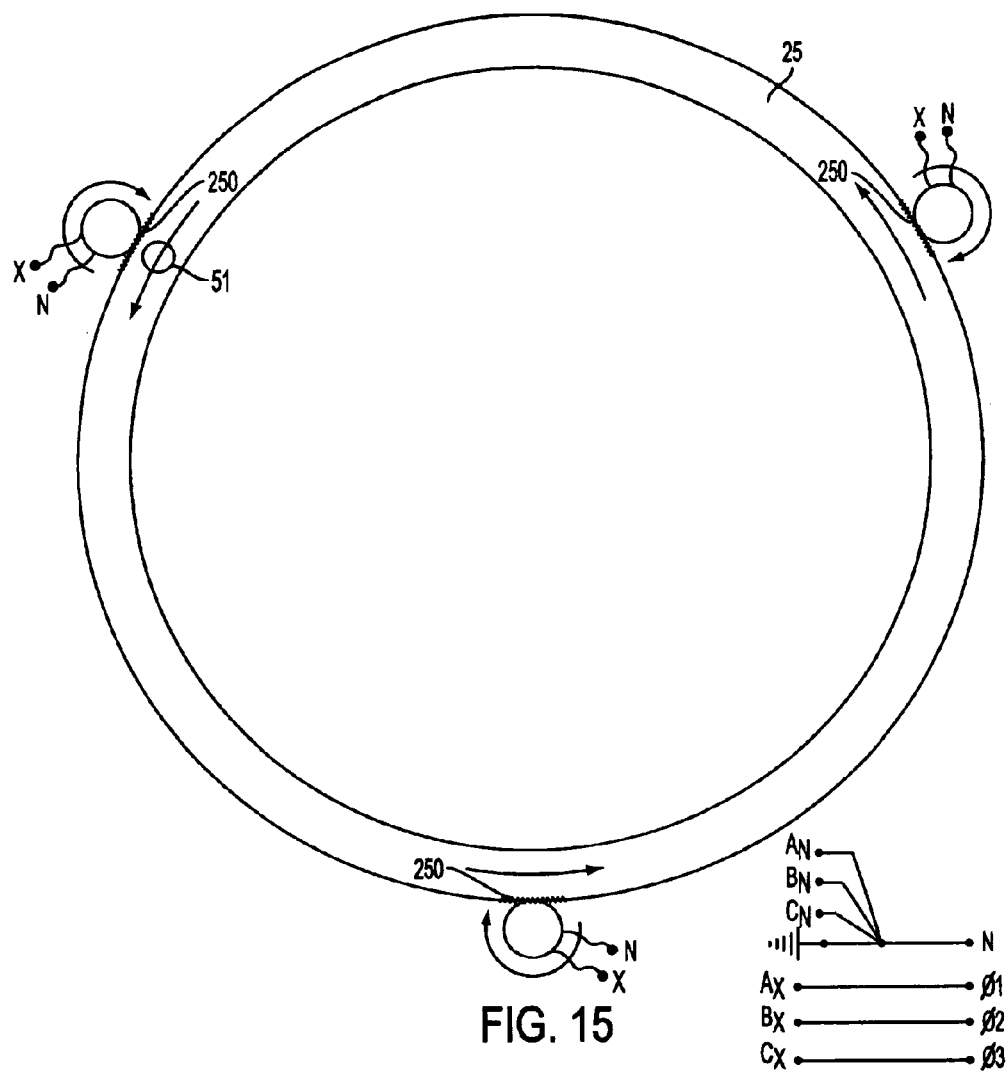
FIG. 15 is a top view of a wind turbine depicting a stator comprising three single phase generators.
Figure 16:
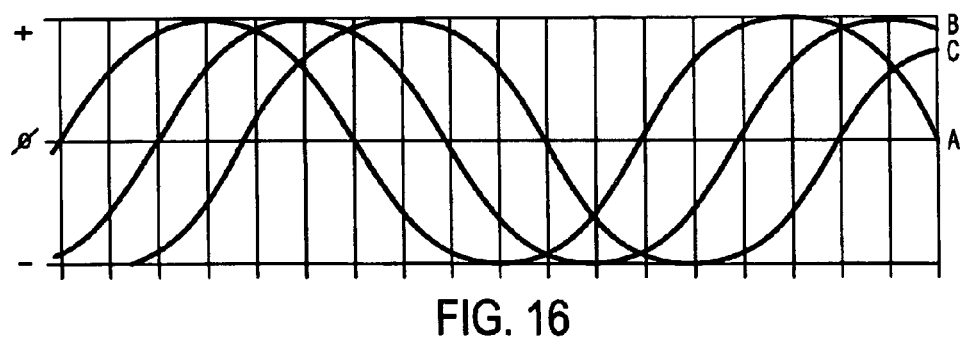
FIG. 16 illustrates timing of the single phase generators to produce a three phase power output.

FIG. 15 depicts an arrangement in which three-phase electrical power may be produced as output by a wind turbine of the wind energy conversion system 10. FIG. 15 illustrates three stator elements 250, each comprising a single phase generator providing a single phase electrical output and having a stator coil disposed along the outer rim 25 of the wind turbine. The single phase generators are disposed at equally spaced radial locations about the vertical rotation axis 15 for mechanical strength and rigidity, but could be disposed at any one or more locations. The single phase electrical outputs of the stator elements 250 are timed to produce a three-phase electrical power output depicted in FIG. 16, which depicts the three-phase electrical power output obtained by timing the single-phase outputs of the stator elements 250. The generators may be AC or DC. The generators may be driven by gears, belts or other means. The three single-phase generators have the advantage of being lighter in weight and lower in cost than one three-phase generator. Where AC generators are used, the additional cost and complexity associated with AC generators should be considered.

Figure 17:
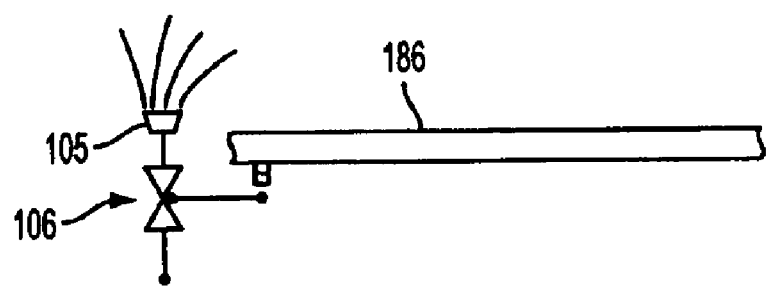
FIG. 17 is a broken fragmentary view depicting a mister control valve for the misting system.

An optional water misting system for the wind energy conversion system 10 is depicted in FIG. 11. The water misting system comprises a water distribution manifold 103 extending circumferentially about the lower platform member 186, a water control valve 104 controlling the supply of water to the manifold 103 from a water source, and a plurality of water misters 105 disposed along the manifold 103 at radially spaced locations about the vertical rotation axis 15. The water control valve 104 may be operated in response to the electrical output of the wind energy conversion system 10 so that water to the manifold 103 is shut off when the wind is not blowing and/or so that the water supply to the manifold 103 is increased/decreased as the electrical output increases/decreases. The water misters 105 are supplied with water from the manifold 103 for discharge from the misters in a spray-like fashion. A mister control valve 106 of the water misting system is depicted in FIG. 17 and is operated by a cam adjacent or along the intake opening 89 of hood 16 to open only the water misters 105 that are situated in front of the intake opening. A sufficient number of water misters 105 are provided at a sufficient number of radial locations about the vertical rotation axis 15 to ensure that at least one water mister 105 is disposed in front of the intake opening 89 for each directional position of the intake opening about the vertical rotation axis 15. The water misting system allows a water mist to be supplied to the intake air entering the intake opening 89 to improve the efficiency of the wind energy conversion system 10. Evaporation of the water mist cools the incoming air and increases its density, allowing more pounds of air to enter the hood 16. A water mist also assists in maintaining a laminar flow of intake air through the hood 16.

Figure 18:
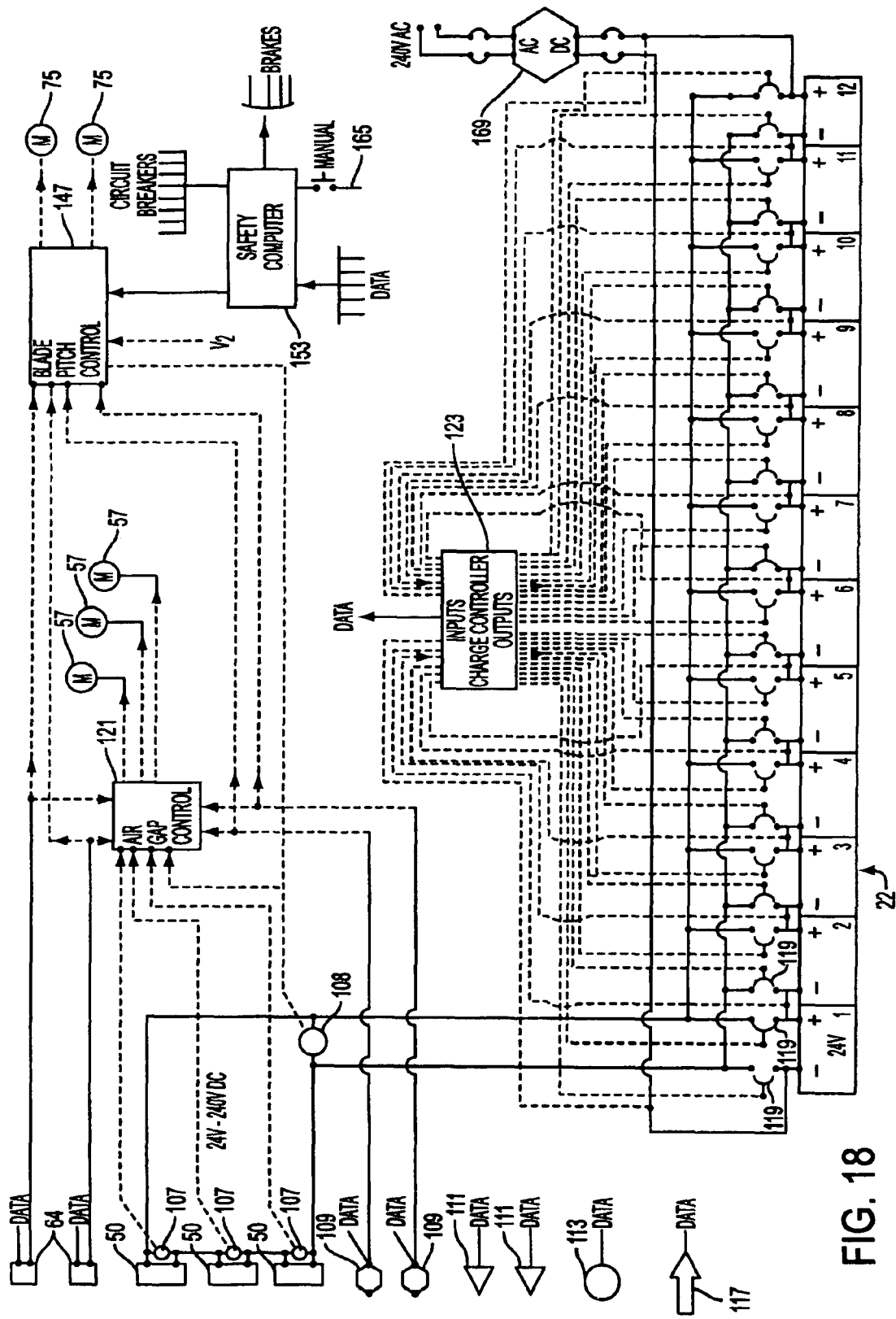
FIG. 18 illustrates a representative control logic schematic for the wind energy conversion system.

A representative control logic schematic for the wind energy conversion system 10 is depicted in FIG. 18. The control logic schematic depicts a torque monitor or strain gage 64 for each wind turbine 12a and 12b to provide readings indicative of direct twist torque on the tower 14. Three stator elements 50 may be provided for each wind turbine 12a and 12b with a voltmeter 107 for each stator element. The wind energy conversion system 10 may also include a master voltmeter 108 to provide data and assist controls. The stator elements 50 are stator coils shown connected in series, which reduces rotational speed, the number of rotor elements or magnets, and the amount of coil windings needed to provide a desired output voltage. Wiring the stator coils in parallel would increase the rotational speed, the number of rotor elements or magnets and/or the amount of coil windings required to produce the same voltage but would allow the use of smaller gauge wire for the coils by reducing the current required through each coil. A tachometer 109 and a blade pitch indicator 111 are provided for each wind turbine 12a and 12b to provide data and assist in controls. An indicator 113 is provided for the hood 16 to provide data relating to operation and yaw of the hood 16. An anemometer 117 is provided for measuring wind force and/or wind velocity. The electrical device 22 is seen as a battery storage bank having terminal remote operated circuit breakers 119 for charging control. An air gap controller 121 processes torque data, voltage data, and rpm data and adjusts the stator elements to achieve a balance between emf drag on the turbines. The air gap controller 121 cooperates with other controls to maintain optimum performance of turbine rpm for wind energy conversion. An air gap control motor 57 is provided for each stator element 50 to control the size of the air between the stator elements and the rotor element rotating therepast. An electrical control system or charge controller 123 monitors each battery and may be used to alert operators when a battery requires maintenance or replacement as a function of its charge rate, discharge rate and/or battery state. The charge controller 123 can be used to allow the output voltage of the wind turbines 12a and 12b to drop to a minimum value while still charging the battery bank 22. For example, in light winds providing low voltage, e.g. 24 volts, the charge controller 123 can still trickle charge the battery bank by switching to a bank voltage just below the turbine output voltage. The control logic schematic shows batteries 2–6 being charged via closed circuit breakers at terminals plus 1 and minus 7 with 120–124 volts. The number of batteries being charged changes as the output voltage from the turbines change. Full voltage, e.g. 288 volts in the example shown in the control logic schematic, is maintained by adjusting the air gap and/or the blade pitch angle via the air gap controller 121 and/or the blade pitch controller 147 for as long as the wind is above a minimum threshold, and the wind energy conversion system 10 continues to function at a lower power output but still full voltage using the variable charging system. Accordingly, the electrical control system 123 allows controlled charging of the batteries as a function of varying output from the wind turbine(s) while maintaining full voltage via an inverter system 169. The blade pitch controller 147 receives input indicative of torque on the tower, turbine rpm and turbine output voltage, and the blade pitch controller 147 outputs a control signal to the blade pitch control motors 75 to regulate rpm for mechanical safety, voltages and tower stress due to turbine torque. A safety computer 153 receives data inputs including turbine rpm, torque and voltages. The safety computer 153 may also receive data inputs from a manual control 165 and/or any other safety features incorporated in the wind energy conversion system 10. The output of the safety computer 153 may operate brakes, circuit breakers and any other function that it is desirable to shut down in the event of problematic performance. An inverter system 169 including a solid state inverter may be provided for drawing power from the DC battery bank and converting that power from DC to AC. The inverter system 169 may also be used to regulate voltage output from the wind energy conversion system 10. Power from the batteries may be used to drive a DC motor which drives an AC generator. Output power from the wind energy conversion system 10 may be used to power or operate various types of DC and AC electric loads.

In operation, the upper and lower wind turbines 12a and 12b are supported by tower 14 in an elevated position above the ground. The hood 16 is self-positioning via the rudder assembly 18 to ensure that the intake opening 89 of the hood is directionally positioned to face into the oncoming wind. Intake air enters the intake opening 89 and passes through the hood 16 and the platform 84 to the wind turbines 12a and 12b. The spinner 31 deflects the intake air within hood 16 away from the center of the turbines to the effective blade area of the turbines. Air passing downwardly through the containment area of the containment structure 39 rotates the blade assemblies of the upper and lower wind turbines 12a and 12b in opposition to one another about the vertical rotation axis 15, since the pitch angle for the blades 26 of the upper wind turbine is in opposition to the pitch angle for the blades 26 of the lower wind turbine 12b. In the illustrated embodiment, the blade assembly of the upper wind turbine 12a rotates counterclockwise about the vertical rotation axis 15 when looking from above while the blade assembly for the lower wind turbine 12b rotates clockwise about the vertical rotation axis 15 when looking from above. As the blade assemblies rotate, the rotor elements 51 carried by their outer rims 25 are rotated past the corresponding stator elements 50 to produce an electrical output. Each wind turbine 12a and 12b produces an electrical output independently and directly. As described above, the electrical output produced by the wind turbines may be DC or AC, and the electrical output is supplied to the electrical device 22. Exhaust air is directed away from the wind turbines by the exhaust plenum 20 and is discharged via the outlet opening 95 of the exhaust plenum, as permitted due to the spaces or openings between frame members 36'. The outlet opening 95 of the exhaust plenum 20 is maintained facing downwind, and a vacuum is produced at the outlet opening 95. The torque produced by each wind turbine 12a and 12b is monitored, and the torques are kept balanced to mitigate or cancel net torque being applied to the tower 14. Net torque is controlled by adjusting the size of the air gaps for the wind turbines and/or adjusting the blade pitch angles for the wind turbines. In a DC system, the sizes of the air gaps may be fixed while letting the output voltage vary and using a charge controller to apply the output voltage to an appropriate number of battery cells for charging. Automatic voltage control of the electrical outputs from the wind turbines may be accomplished by varying the size of the air gaps to restrict voltage changes due to changes in turbine rotational speed.

The advantages of the wind energy conversion system of the present invention are apparent when wind energy conversion systems having wind turbines of different outer rim diameters are compared to a representative conventional generator having an armature two feet in diameter running at 900 rpm. A 2 ft diameter armature in a conventional generator would have a circumference of $\pi \times 2$ or 6.283 ft. A wind energy conversion system having a wind turbine with a 10 ft diameter outer rim would have a circumference of $\pi \times 10$ or 31.4145 ft.

The magnetic flux peripheral velocity of the conventional generator running at 900 rpm with a 2 ft diameter armature is:

$$V = \pi \times 2 \times \frac{900}{60} = 94.26 \text{ ft/sec.}$$

Dividing the magnetic flux peripheral velocity of the conventional generator by the circumference of the 10 ft outer rim of the wind energy conversion system $$\frac{V}{C} = \frac{94.26}{31.4145} = 3.000 \text{ rps} = 180 \text{ rpm}$$

This rotational speed represents the revolutions per minute that the 10 ft diameter outer rim of the wind energy conversion system 10 must turn to have the same magnetic flux peripheral velocity as the conventional generator having the 2 ft diameter armature running at 900 rpm or 15 rps.)

Table A set forth below indicates the outer rim circumference (C) in feet and the magnetic flux peripheral velocity (V) of the conventional generator having the 2 ft diameter armature at 900 rpm divided by the outer rim circumference $$\left(\frac{V}{C}\right),$$

in revolutions per second (rps) and revolutions per minute (rpm), for outer rims having diameters of 10 ft, 15 ft, 20 ft, 25 ft, 30 ft, 35 ft, 40 ft and 45 ft, thereby showing the rotational speed needed for the outer rims to have the same magnetic flux peripheral velocity as the conventional generator with the 2 ft diameter armature at 900 rpm.

TABLE A

| Diameter | C in Feet | V/C = Rps | V/C = Rpm |
| --- | --- | --- | --- |
| 10 | 31.4145 | 3.2 | 180 |
| 15 | 47.1218 | 2.0 | 120 |
| 20 | 62.8290 | 1.5 | 90 |
| 25 | 78.5362 | 1.2 | 72 |
| 30 | 94.2435 | 1.0 | 60 |
| 35 | 109.9508 | 0.857 | 51.4 |
| 40 | 125.6580 | 0.750 | 45 |
| 45 | 141.3652 | 0.667 | 40 |

Assuming a 0.1 inch diameter wire for the stator coils of the conventional generator and a wind turbine of the wind energy conversion system, there would be 10 turns per inch in the stator coils. In the conventional generator having the 2 ft diameter armature, there would be 6.283×12 inches per foot×10 turns per inch or 754 turns of wire in the stator coil. If the stator coil of the wind turbine is continuous along a 10 ft diameter outer rim in the wind energy conversion system, there would be 3,770 turns of wire in the stator coil. Accordingly, the stator coil of the wind energy conversion system is proportionally larger than that of the representative conventional generator by the diameter ratio.

Since the output of a generator is a function of not only the magnetic flux peripheral velocity past the stator coil but also the total number of turns of wire in the stator coil, a full stator coil along the larger diameter outer rim of a wind turbine in the wind energy conversion system reduces the rpms that the outer rim must turn to match the performance of the conventional generator with the 2 ft diameter armature.

Table B set forth below depicts the rotational speed in rpm needed for the outer rim of a wind turbine in the wind energy conversion system to have comparable power to the conventional generator with the 2 ft diameter armature running at 900 rpm using a comparable turns per inch for the stator coils with respect to outer rims having diameters of 10 ft, 15 ft, 20 ft, 25 ft, 30 ft, 35 ft, 40 ft and 45 ft.

TABLE B

| Diameter | Rpm |
| --- | --- |
| 10 | 36 |
| 15 | 16 |
| 20 | 9 |
| 25 | 5.76 |
| 30 | 4 |
| 35 | 2.94 |
| 40 | 2.25 |
| 45 | 1.78 |

It is seem from the above that a wind turbine having an outer rim of 10 ft diameter in the wind energy conversion system has the same magnetic flux peripheral velocity at 180 rpm as the conventional generator with the 2 ft diameter armature running at 900 rpm, and further there is five times the number of turns of wire in the stator coil for the 10 ft diameter outer rim. A wind energy conversion system having a wind turbine with a 10 ft diameter outer rim and a full rim stator coil therefore needs to turn only 180 rpm÷5×the turns=36 rpm as seen in Table B. In addition, the wind turbine of the wind energy conversion system may include five times the number of rotor elements or permanent magnets along its outer rim thereby increasing the flux crossing the stator coils so that rotating a 10 ft diameter outer rim at 7.2 rpm generates the same power as the conventional generator having the 2 ft diameter armature running at 900 rpm as exhibited in the following Table C showing the rotational speed needed for 10 ft., 15 ft., 20 ft., 25 ft., 30 ft., 35 ft., 40 ft., and 45 ft. diameter outer rims to generate the same power as the conventional generator.

TABLE C

| Diameter | Rpm |
| --- | --- |
| 10 | 7.2 |
| 15 | 2.13 |
| 20 | 0.90 |
| 25 | 0.46 |
| 30 | 0.27 |
| 35 | 0.17 |
| 40 | 0.11 |
| 45 | 0.08 |

This feature may be exploited to design shorter, discrete stator coil elements along the outer rim of a wind turbine in the wind energy conversion system rather than a full circumference stator coil and to design complementary rotor elements or magnets which reduce the amount of material required and the cost and the weight of the wind energy conversion system. Providing a sufficient number of rotor elements or magnets and stator coil elements refrains the rpm and reduces centrifugal forces produced on the wind energy conversion system which also reduces overall design costs and weight.

In a wind energy conversion system designed to produce 500 KWe at 40 mph with a 4 MW generator comprising one or more wind turbines as described herein, the power output from the system will continue to increase up to 80 mph wind and will continue to produce 4 MW output power at 80 mph and higher wind speeds. Assuming a site with an average annual wind of 10 mph, the following Table D shows the hours or higher wind needed to equal the annual average power output at 10 mph wind.

TABLE D

| Wind Mph | Equiv Hours | Equiv Days | Out KWe |
| --- | --- | --- | --- |
| 10 | 8,760 | 365 | 9 |
| 15 | 2,595 | 108 | 26 |
| 20 | 1,095 | 46 | 63 |
| 25 | 560 | 23 | 122 |
| 30 | 324 | 13.5 | 211 |
| 35 | 204 | 8.5 | 335 |
| 40 | 137 | 5.7 | 500 |
| 45 | 96 | 4 | 712 |
| 50 | 70 | 2.9 | 977 |
| 55 | 53 | 2.2 | 1,300 |
| 60 | 41 | 1.7 | 1,688 |
| 65 | 32 | 1.3 | 2,146 |
| 70 | 26 | 1.08 | 2,680 |
| 75 | 21 | 0.88 | 3,296 |
| 80 | 17 | 0.71 | 4,000 |

Although each site must be evaluated for both the annual average as well as the hours at various wind speeds to determine where to situate the wind energy conversion system, in certain geographical areas, such as the Midwest, where winds of 80 mph are not unusual during certain months of the year, larger generator capacities and the ability to remain online in high winds radically improves cost effectiveness of the wind energy conversion system.

The wind energy conversion system of the present invention can achieve weights and costs under 20% that of conventional systems per KWe capacity and allow for large generating capacities to be placed higher in the air where increased air speed further adds to the cost effectiveness of the system. The Vesta V39 has a total of 672 square feet of blade surface area and uses 14,313 square feet of air space to output 500 KWe. A wind energy conversion system according to the present invention having a wind turbine with a 45 foot diameter outer rim has 1,590 square feet of blade area and sweeps 1,590 square feet while outputting 3 MW. Accordingly, the wind energy conversion system according to the present invention provides six times the power output using one ninth the air space or 54 times the power output per acre.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A wind energy conversion system comprising
    an upper wind turbine comprising a stator, a blade assembly mounted for rotation in a first direction about a vertical rotation axis in response to air flow through said upper wind turbine, and a rotor carried by said blade assembly for rotation past said stator to produce an electrical output;
    a lower wind turbine disposed beneath said upper wind turbine and comprising a stator, a blade assembly mounted for rotation in a second direction, opposite said first direction, about said vertical rotation axis in response to air flow through said lower wind turbine, and a rotor carried by said blade assembly of said lower wind turbine for rotation past said stator of said lower wind turbine to produce an electrical output, each of said upper and lower wind turbines producing a torque;
    a tower supporting said upper and lower wind turbines in an elevated position above the ground; and
    a balancing mechanism for balancing said torques to avoid a net torque.

2. The wind energy conversion system recited in claim 1 wherein said blade assembly for said upper wind turbine comprises an inner rim, an outer rim disposed concentrically around said inner rim, and a plurality of blades extending between said inner and outer rims radial to said vertical rotation axis, said blade assembly for said lower wind turbine comprises an inner rim, an outer rim disposed concentrically around said inner rim for said lower wind turbine, and a plurality of blades extending between said inner and outer rims for said lower wind turbine radial to said vertical rotation axis, said blades of said upper wind turbine being oriented in opposition to said blades of said lower wind turbine, and further including a drum disposed within said inner rims and a spinner extending above said blade assembly for said upper wind turbine for deflecting air toward said blades.

3. The wind energy conversion system recited in claim 2 wherein said rotor for said upper wind turbine comprises a plurality of permanent magnets carried by said outer rim of said upper wind turbine for rotation in a rotational path of movement about said vertical rotation axis, said stator for said upper wind turbine comprises a plurality of stator coils at spaced locations along said rotational path of movement, said rotor for said lower wind turbine comprises a plurality of permanent magnets carried by said outer rim of said lower wind turbine for rotation in a rotational path of movement about said vertical rotation axis, and said stator for said lower wind turbine comprises a plurality of stator coils at spaced locations along said rotational path of movement for said lower wind turbine.

4. The wind energy conversion system recited in claim 2 wherein said rotor for said upper wind turbine comprises a plurality of permanent magnets carried by said outer rim of said upper wind turbine for rotation in a rotational path of movement about said vertical rotation axis, said stator for said upper wind turbine comprises three single phase generators each having a stator coil along said rotational path of movement, said generators being timed to produce a three-phase electrical output, said rotor of said lower wind turbine comprises a plurality of permanent magnets carried by said outer rim of said lower wind turbine for rotation in a rotational path of movement about said vertical rotation axis, and said stator for said lower wind turbine comprises three single phase generators each having a stator coil along said rotational path of movement for said lower wind turbine, said generators of said lower wind turbine being timed to obtain a three-phase electrical output.

5. The wind energy conversion system recited in claim 3 wherein said rotor for said upper wind turbine comprises a plurality of permanent magnets carried by said outer rim of said upper wind turbine for rotation in a planar rotational path of movement about said vertical rotation axis, each of said stator coils for said upper wind turbine comprises a pair of curved stator coil segments extending along said rotational path of movement with said stator coil segments curving away from the plane of said rotational path of movement to produce an electrical output of changing voltage, said rotor of said lower wind turbine comprises a plurality of permanent magnets carried by said outer rim of said lower wind turbine for rotation in a planar rotational path of movement about said vertical rotation axis, each of said stator coils for said lower wind turbine comprises a pair of curved stator coils extending along said rotational path of movement for said lower wind turbine with said stator coil segments for said lower wind turbine curving away from the plane of said rotational path of movement for said lower wind turbine to produce an electrical output of changing voltage.

6. The wind energy conversion system recited in claim 2 wherein said blades of said upper wind turbine have a pitch angle, said blades of said lower wind turbine have a pitch angle in opposition to said pitch angle of said upper wind turbine, and said balancing mechanism includes a pitch adjustment mechanism for each of said wind turbines for adjusting said pitch angles of said blades.

7. The wind energy conversion system recited in claim 1 wherein said rotor for said upper wind turbine comes into alignment with said stator for said upper wind turbine as said rotor for said upper wind turbine rotates therepast, said stator of said upper wind turbine being spaced from said rotor aligned therewith by an air gap, said rotor of said lower wind turbine comes into alignment with said stator for said lower wind turbine as said rotor for said lower wind turbine rotates therepast, said stator for said lower wind turbine being spaced from said rotor aligned therewith by an air gap, and said balancing mechanism includes an air gap adjustment mechanism for each of said wind turbines for adjusting the size of said air gaps.

8. The wind energy conversion system recited in claim 1 wherein said tower is a guyed tower comprising a frame defining a containment area for said upper and lower wind turbines, a base supporting said frame at an elevated position above the ground, and a plurality of guy cables anchored to the ground and connected to at least one of said frame and said base.

9. The wind energy conversion system recited in claim 1 and further comprising a hood disposed over said upper wind turbine and having an air intake opening facing lateral to said vertical rotation axis for directing intake air to said upper and lower wind turbines, and an exhaust plenum disposed below said lower wind turbine for directing exhaust air away from said wind turbines, said exhaust plenum having an outlet opening facing away from said vertical rotation axis.

10. The wind energy conversion system recited in claim 9 wherein said hood and said exhaust plenum are mounted for rotation about said vertical rotation axis, and further comprising a rudder assembly for effecting rotation of said hood about said vertical rotation axis to maintain said intake opening facing upwind, and an exhaust plenum drive mechanism for rotating said exhaust plenum about said vertical rotation axis to maintain said outlet opening facing downwind.

11. The wind energy conversion system recited in claim 9 and further including a plurality of openable and closeable relief ports in said hood, said relief ports being openable to relieve excess intake air from said hood.

12. The wind energy conversion system recited in claim 9 and further including a water misting system for releasing water into the intake air.

13. The wind energy conversion system recited in claim 1 and further including a strain gauge for each of said wind turbines for monitoring and controlling said torques.

* * * * *